United States Patent
Kawamura

(10) Patent No.: US 8,980,384 B2
(45) Date of Patent: Mar. 17, 2015

(54) NEMATIC LIQUID CRYSTAL COMPOSITION AND LIQUID CRYSTAL DISPLAY DEVICE USING THE SAME

(75) Inventor: Jouji Kawamura, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/346,937

(22) PCT Filed: Aug. 16, 2012

(86) PCT No.: PCT/JP2012/070834
§ 371 (c)(1),
(2), (4) Date: Mar. 24, 2014

(87) PCT Pub. No.: WO2014/006767
PCT Pub. Date: Jan. 9, 2014

(65) Prior Publication Data
US 2014/0231712 A1    Aug. 21, 2014

(30) Foreign Application Priority Data

Jul. 3, 2012 (JP) .................................. 2012-149421

(51) Int. Cl.
| | | |
|---|---|---|
| *C09K 19/30* | (2006.01) | |
| *C09K 19/20* | (2006.01) | |
| *C09K 19/44* | (2006.01) | |
| *C09K 19/12* | (2006.01) | |
| *C09K 19/34* | (2006.01) | |
| *C09K 19/42* | (2006.01) | |
| *C09K 19/04* | (2006.01) | |

(52) U.S. Cl.
CPC ............. *C09K 19/3068* (2013.01); *C09K 19/20* (2013.01); *C09K 19/42* (2013.01); *C09K 19/44* (2013.01); *C09K 19/3066* (2013.01); *C09K 2019/0448* (2013.01); *C09K 2019/0466* (2013.01); *C09K 2019/124* (2013.01); *C09K 2019/3004* (2013.01); *C09K 2019/301* (2013.01); *C09K 2019/3025* (2013.01); *C09K 2019/3078* (2013.01)
USPC .................. 428/1.1; 252/299.61; 252/299.63; 252/299.66; 252/299.67

(58) Field of Classification Search
USPC ............ 428/1.1; 252/299.61, 299.63, 299.66, 252/299.67
See application file for complete search history.

(56) References Cited

U.S. PATENT DOCUMENTS

| | | | | |
|---|---|---|---|---|
| 7,485,351 | B2 * | 2/2009 | Saito | .............................. 428/1.1 |
| 8,012,370 | B2 * | 9/2011 | Wittek et al. | ............. 252/299.66 |
| 8,444,878 | B2 * | 5/2013 | Fujita et al. | .............. 252/299.63 |
| 2008/0029737 | A1 | 2/2008 | Saito | |
| 2010/0243956 | A1 * | 9/2010 | Wittek et al. | ............. 252/299.61 |
| 2010/0302498 | A1 | 12/2010 | Saito | |
| 2011/0051023 | A1 | 3/2011 | Fujita et al. | |

FOREIGN PATENT DOCUMENTS

| | | |
|---|---|---|
| JP | 2008-37918 A | 2/2008 |
| JP | 2008-038018 A | 2/2008 |
| JP | 2010-275390 A | 12/2010 |
| JP | 2011-52120 A | 3/2011 |

OTHER PUBLICATIONS

International Search Report dated Sep. 11, 2012, issued in corresponding application No. PCT/JP2012/070834.

\* cited by examiner

*Primary Examiner* — Shean C Wu
(74) *Attorney, Agent, or Firm* — Westermann, Hattori, Daniels & Adrian, LLP

(57) ABSTRACT

A liquid crystal composition of the present invention has a liquid phase over a wide temperature range, low viscosity, good solubility at a low temperature, high resistivity and voltage holding ratio, and stability to heat and light, and can thus provide, in high yield, a liquid crystal display device having good display quality and causing little display defects such as image sticking, dropping marks, and the like. A liquid crystal display device using the liquid crystal composition of the present invention is useful, particularly useful for a liquid crystal display device for active matrix driving, because both fast response and suppression of display defects are achieved, and the liquid crystal display device can be applied to a liquid crystal display device for a VA mode, a PSVA mode, or a TN mode.

21 Claims, No Drawings

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition useful as a liquid crystal display material and exhibiting a positive value of dielectric anisotropy (Δ∈), and also relates to a liquid crystal display device using the composition.

BACKGROUND ART

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a vertical alignment mode and an IPS (in-plane switching) mode using TFT (thin-film transistor), and the like. Liquid crystal compositions used for these liquid crystal display devices are required to have stability to external stimuli such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have optimum values of dielectric anisotropy (Δ∈) and/or refractive index anisotropy (Δn) for a display device.

A vertical alignment (VA)-mode display uses a liquid crystal composition having negative Δ∈, while a horizontal alignment-mode display, such as a TN mode, a STN mode, an IPS (in-plane switching) mode, or the like, uses a liquid crystal composition having positive Δ∈. Also, there has been reported a driving method in which a liquid crystal composition having positive Δ∈ is vertically aligned with no voltage applied, and display is performed by applying a transverse electric field, and the need for a liquid crystal composition having positive Δ∈ is further increased. On the other hand, low-voltage driving, fast response, and a wide operating temperature range are required for all driving methods. That is, a large absolute value of positive Δ∈, low viscosity (η), and a high nematic-isotropic liquid phase transition temperature (Tni) are required. Also, in view of setting of Δn×d which is the product of Δn and a cell gap (d), it is necessary to adjust Δn of a liquid crystal composition within a proper range according to the cell gap. In addition, when a liquid crystal display device is applied to a television or the like, fast response is regarded as important, and thus a liquid crystal composition having low rotational viscosity (γ1) is required.

A liquid crystal composition disclosed as a configuration of a fast response-oriented liquid crystal composition uses, for example, a compound represented by formulae (A-1) or (A-2), which is a liquid crystal compound having positive Δ∈, in combination with a liquid crystal compound (B) having neutral Δ∈. In the field of liquid crystal compositions, the liquid crystal composition is widely known to be characterized in that the liquid crystal compound having positive Δ∈ has a —CF2O— structure, and the liquid crystal compound having neutral Δ∈ has an alkenyl group (Patent Literatures 1 to 4).

[Chem. 1]

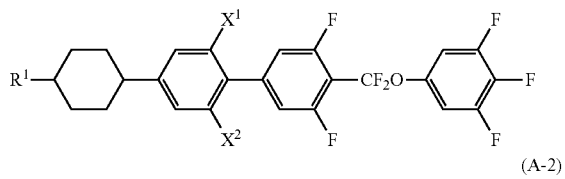

(A-1)

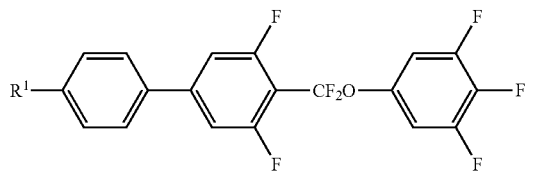

(A-2)

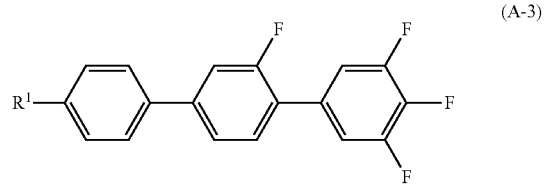

(A-3)

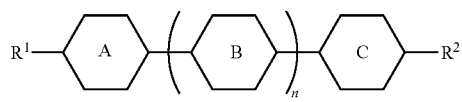

(B)

With expanding application of liquid crystal display devices, significant changes are found in use method and manufacturing method thereof. In order to cope with these changes, it is demanded to optimize characteristics other than basic physical property values which have been known. That is, VA-mode and IPS-mode liquid crystal display devices using liquid crystal compositions are widely used, and super-sized liquid crystal devices of 50 inches or more are put into practical application. With increases in substrate size, instead of a usual vacuum injection method, a one drop fill (ODF) method becomes the mainstream of a method of injecting a liquid crystal composition into a substrate, but when a liquid crystal composition is dropped on a substrate, the problem of degrading display quality by dropping marks is surfaced. Further, in a process of manufacturing a liquid crystal display device by the ODF method, it is necessary to drop a liquid crystal in an optimum amount according to the size of a liquid crystal display device. A large deviation of the dropping amount from the optimum value disrupts a balance between previously designed refractive index and driving electric field of a liquid crystal display device and causes the occurrence of spots and display defects such as contrast defect and the like. In particular, small liquid crystal display devices in heavy use for recently popular smart phones have a small optimum amount of liquid crystal filling, and thus it is difficult to control a deviation from the optimum value within a predetermined range. Therefore, in order to maintain liquid crystal display devices in high yield, also required is, for example, the performance of being little influenced by a rapid pressure change and impact produced in a dropping apparatus during dropping of a liquid crystal, and being capable of continuous stable dropping of a liquid crystal over a long time.

Accordingly, for liquid crystal compositions used for active matrix drive liquid crystal display devices which are driven with TFT elements or the like, developments are being required in view of a method for manufacturing a liquid crystal display device in addition to the characteristic of having high resistivity or high voltage holding ratio, which has been regarded as important, and stability to external stimuli such as light, heat, and the like while maintaining the characteristics and performance, such as fast response and the like, which are required for liquid crystal display devices.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

A problem to be solved by the invention is to provide a liquid crystal composition having positive $\Delta\varepsilon$, a liquid phase over a wide temperature range, low viscosity, good solubility at a low temperature, high resistivity and voltage holding ratio, and stability to heat and light, and further provide, in high yield, a liquid crystal display device of a TN-mode which includes the liquid crystal composition and thus has good display quality and causes little display defects such as image sticking, dropping marks, and the like.

Solution to Problem

As a result of research on various liquid crystal compounds and various chemical substances, the inventors of the present invention found that the problem can be resolved by combining specified liquid crystal compounds, leading to the achievement of the present invention.

That is, the present invention provides a liquid crystal composition having positive dielectric anisotropy and including a component (A), which is a dielectrically positive component containing a dielectrically positive compound represented by (Formula-1),

[Chem. 2]

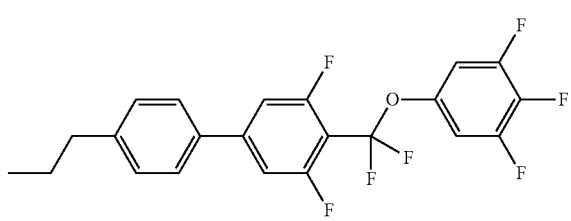

(Formula-1)

and a dielectrically neutral component (B) having a dielectric anisotropy of more than −2 and less than +2 and containing a dielectrically neutral compound represented by (Formula-2),

[Chem. 3]

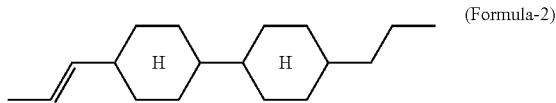

(Formula-2)

(in the formula, a ring

[Chem. 4]

represents a 1,4-transcyclohexylene group), and further provides a liquid crystal display device using the liquid crystal composition.

Advantageous Effects of Invention

The liquid crystal composition having positive dielectric anisotropy according to the present invention can obtain significantly low viscosity and has practicability for products because of good solubility at a low temperature and very small changes in resistivity and voltage holding ratio with heat and light, and thus a TN-mode liquid crystal display device using the composition can achieve fast response. Also, the performance can be stably exhibited during a process for manufacturing a liquid crystal display device, and thus display defects due to the process can be suppressed, thereby permitting high-yield manufacture and exhibiting high usefulness.

DESCRIPTION OF EMBODIMENTS

A liquid crystal composition having positive dielectric anisotropy according to the present invention contains a dielectrically positive component (A). Further, the component (A) contains a compound represented by (Formula-1),

[Chem. 5]

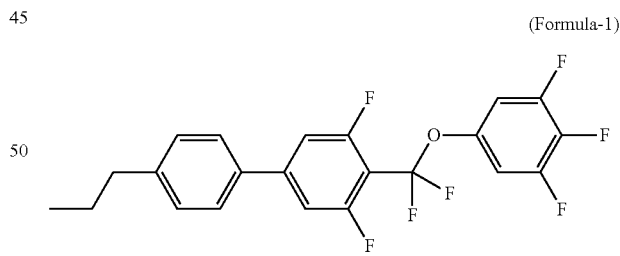

(Formula-1)

The content of a compound constituting the component (A) and represented by (Formula-1) in the liquid crystal composition of the present invention is preferably 2% by mass or more, more preferably 5% by mass, still more preferably 11% by mass or more, even still more preferably 19% by mass or more, and particularly preferably 26% by mass or more, relative to the total amount of the liquid crystal composition of the present invention.

The dielectrically positive component (A) in the liquid crystal composition of the present invention can contain a compound selected from a compound group represented by (Formula-5.1) to (Formula-5.4),

[Chem. 6]

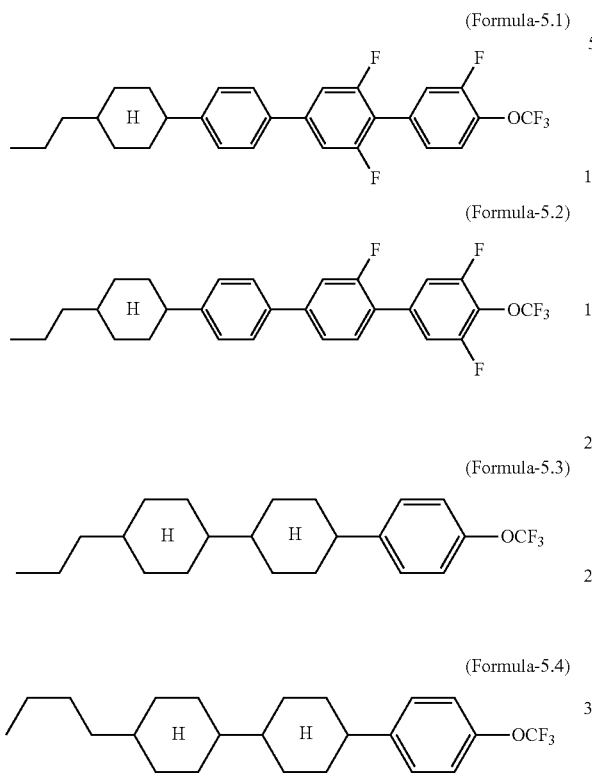

(in the formulae, a ring

[Chem. 7]

represents a 1,4-transcyclohexylene group). The component (A) may contain only one or two or more of these compounds, but the compounds are preferably used in proper combination according to the intended performance. When low viscosity is desired, a combination including compounds represented by (Formula-5.3) and (Formula-5.4) may be selected, and when a high nematic-isotropic liquid phase transition temperature (Tni) is desired, a combination including compounds represented by (Formula-5.1) and (Formula-5.2) may be selected. Although the types of compounds which can be combined are not particularly limited, one to three of these compounds are preferably contained, and one to two compounds are more preferably contained. The content of the compounds is preferably 3% by mass or more, more preferably 6% by mass, still more preferably 12% by mass, even still more preferably 16% by mass, even still more further preferably 22% by mass, and particularly preferably 26% by mass, relative to the total amount of the liquid crystal composition of the present invention.

The dielectrically positive component (A) in the liquid crystal composition of the present invention can also contain a compound selected from a compound group represented by (Formula-6.1) to (Formula-6.7),

[Chem. 8]

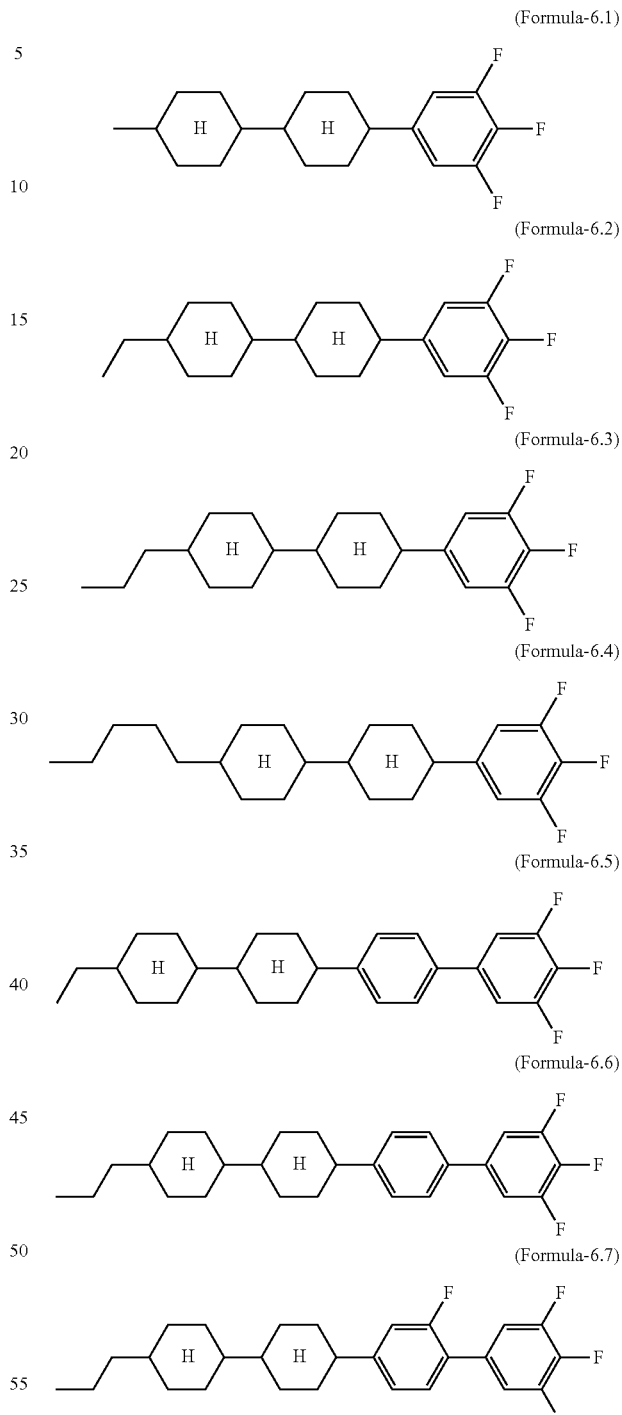

(in the formulae, a ring

[Chem. 9]

represents a 1,4-transcyclohexylene group). The component (A) may contain only one or two or more of these compounds, but the compounds are preferably used in proper combination according to the intended performance. When low birefringence or low viscosity is desired, a combination including compounds represented by (Formula-6.1) to (Formula-6.3) may be selected, and when high Tni is desired, a combination including compounds represented by (Formula-6.4) to (Formula-6.7) may be selected. Although the types of compounds which can be combined are not particularly limited, one to five of these compounds are preferably contained, one to four compounds are more preferably contained, and one to three compounds are particularly preferably contained. The content of the compounds is preferably 5% by mass or more, more preferably 6% by mass or more, still more preferably 9% by mass or more, even still more preferably 20% by mass or more, even still more further preferably 13% by mass or more, even still more further preferably 17% by mass or more, and particularly preferably 21% by mass or more, relative to the total amount of the liquid crystal composition of the present invention.

The dielectrically positive component (A) in the liquid crystal composition of the present invention can further contain a compound selected from a compound group represented by (Formula-9.1) to (Formula-9.3), (Formula-9.2) has a high molecular weight and is thus effective for enhancing Tni but viscosity is also increased due to its high molecular weight. Therefore, the positive component (A) preferably contains a compound represented by (Formula-9.2) in an amount of 0.5% by mass or more and less than 11% by mass, more preferably 0.5% by mass or more and less than 8% by mass, and still more preferably 0.5% by mass or more and less than 5% by mass, relative to the total amount of the liquid crystal composition of the present invention. In addition, the positive component (A) preferably contains a compound represented by (Formula-9.1) in an amount of 4% by mass or more, more preferably 7% by mass or more, still more preferably 13% by mass or more, even still more preferably 19% by mass or more, and even still more further preferably 25% by mass or more, relative to the total amount of the liquid crystal composition of the present invention. Like the compound represented by (Formula-9.1), a compound represented by (Formula-9.3) has an optimum content. Although the types of compounds which can be combined are not particularly limited, one to three of these compounds are preferably contained, and one or two compounds are more preferably contained.

The dielectrically positive component (A) in the liquid crystal composition of the present invention can further contain a compound selected from a compound group represented by (Formula-10.1) to (Formula-10.4),

[Chem. 10]

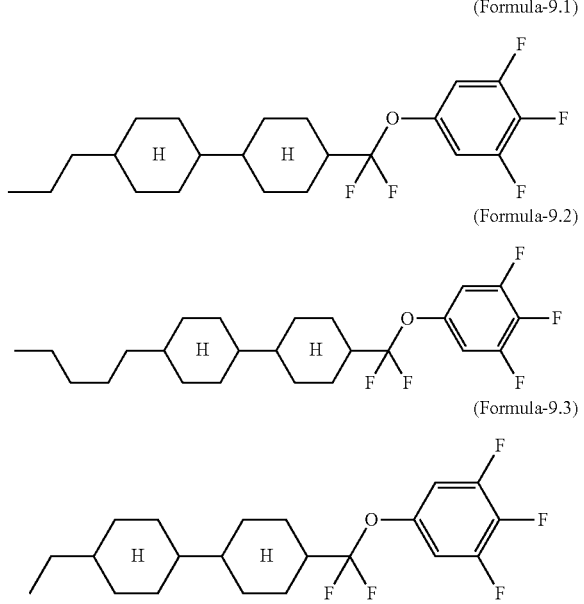

(Formula-9.1)

(Formula-9.2)

(Formula-9.3)

(in the formulae, a ring

[Chem. 11]

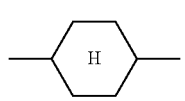

represents a 1,4-transcyclohexylene group). These compounds have different molecular weights due to terminal alkyl group structures, and the content thereof is appropriately adjusted because viscosity and Tni vary according to molecular weights. For example, a compound represented by

[Chem. 12]

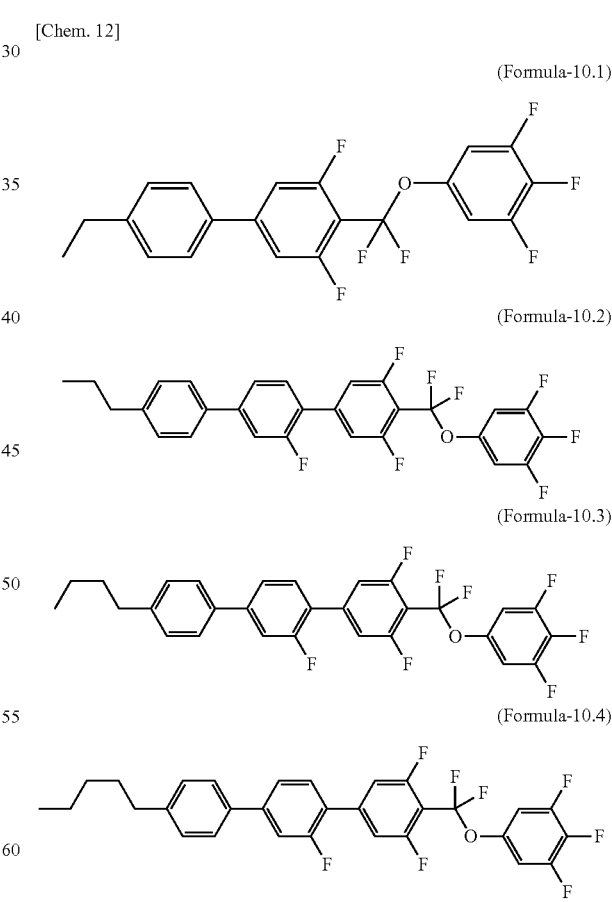

(Formula-10.1)

(Formula-10.2)

(Formula-10.3)

(Formula-10.4)

These compounds are useful for obtaining a liquid crystal composition having large dielectric anisotropy (Δ∈) and low viscosity and are thus preferably used in proper combination in view of required Tni. In order to achieve large Δ∈, the component (A) preferably contains a compound represented by (Formula-10.1) in an amount of 9% by mass or more relative to the total amount of the liquid crystal composition of the present invention, more preferably 13% by mass or more relative to the total amount of the liquid crystal composition of the present invention, and still more preferably 16% by mass or more relative to the total amount of the liquid crystal composition of the present invention. Also, in order to achieve high Tni as well as large Δ∈, the positive component (A) preferably contains a compound selected from the group consisting of compounds represented by (Formula-10.2) to (Formula-10.4) in an amount of 4% by mass or more, more preferably 7% by mass or more, still more preferably 10% by mass or more, and particularly preferably 14% by mass or more, relative to the total amount of the liquid crystal composition of the present invention. Further, the component (A) preferably contains at least two compounds selected from the group consisting of compounds represented by (Formula-10.2) to (Formula-10.4) because solubility is improved, and the total content thereof is preferably 14% by mass or more and more preferably 21% by mass or more relative to the total amount of the liquid crystal composition of the present invention. Further, the component (A) preferably contains at least three compounds selected from the group consisting of compounds represented by (Formula-10.2) to (Formula-10.4) because solubility is further improved, and the total content thereof is preferably 16% by mass or more and more preferably 24% by mass or more. Although the types of compounds which can be combined are not particularly limited, one to four of these compounds are preferably contained, and one or three compounds are more preferably contained.

The dielectrically positive component (A) in the liquid crystal composition of the present invention can further contain a compound selected from a compound group represented by (Formula-12.1) to (Formula-12.5),

[Chem. 13]

(Formula-12.1)

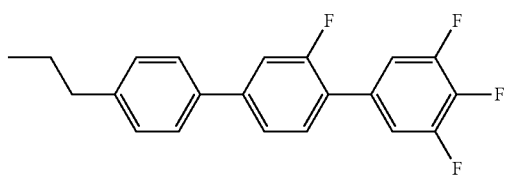

(Formula-12.2)

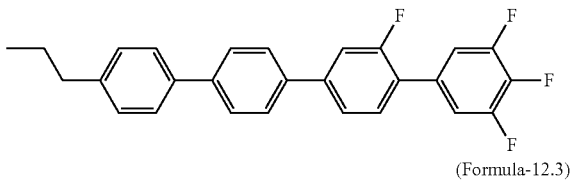

(Formula-12.3)

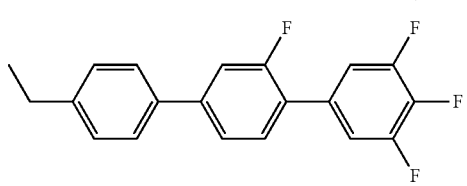

(Formula-12.4)

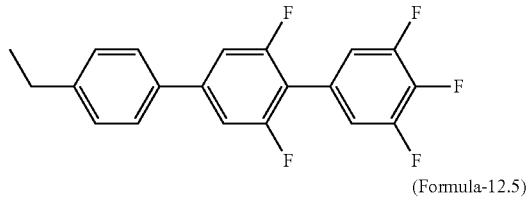

(Formula-12.5)

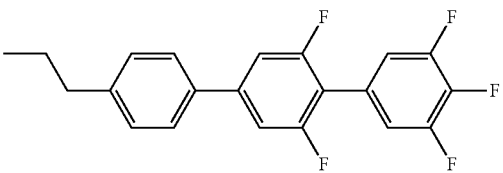

Although the types of compounds which can be combined are not particularly limited, one to four of these compounds are preferably contained, and one or three compounds are more preferably contained. Also, it is necessary to adjust the content of a compound having such a structure with attention to solubility, and for example, the component (A) preferably contains a compound represented by (Formula-12.2) or (Formula-12.3) in an amount of 0.5% by mass or more and less than 5% by mass, a compound represented by (Formula-12.1) in an amount of 115% by mass or more, and a compound represented by (Formula-12.2) or (Formula-12.3) in an amount of 0.5% by mass or more and less than 3% by mass, relative to the total amount of the liquid crystal composition of the present invention.

The dielectrically positive component (A) in the liquid crystal composition of the present invention can further contain a compound selected from a compound group represented by (Formula-13.1) to (Formula-13.3),

[Chem. 14]

(Formula-13.1)

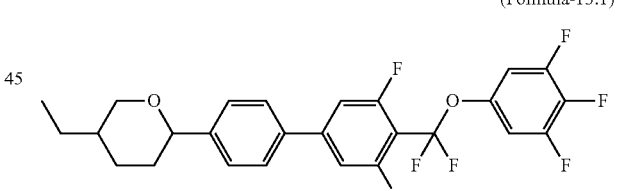

(Formula-13.2)

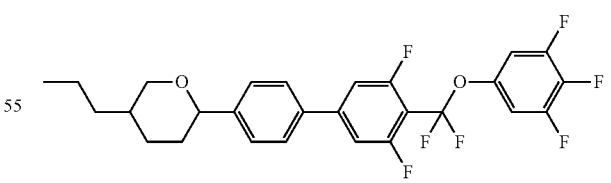

(Formula-13.3)

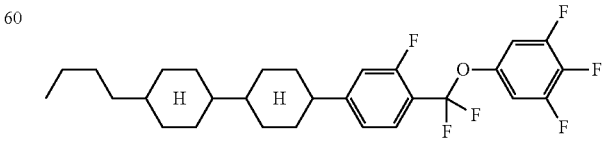

(in the formulae, a ring

[Chem. 15]

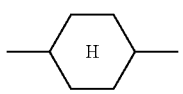

represents a 1,4-transcyclohexylene group). Although the types of compounds which can be combined are not particularly limited, one to three of these compounds are preferably contained in view of birefringence and Tni. The component (A) preferably contains a compound selected from the compound group represented by (Formula-13.1) to (Formula-13.3) in an amount of 7% by mass or more, more preferably 9% by mass or more, and still more preferably 17% by mass or more, relative to the total amount of the liquid crystal composition of the present invention.

The dielectrically positive component (A) in the liquid crystal composition of the present invention can further contain a compound selected from a compound group represented by (Formula-17.1) to (Formula-17.4),

[Chem. 16]

(Formula-17.1)

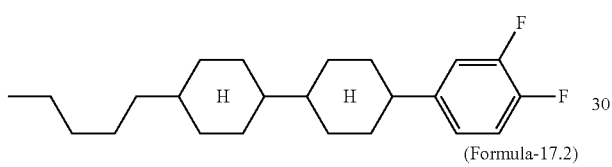

(Formula-17.2)

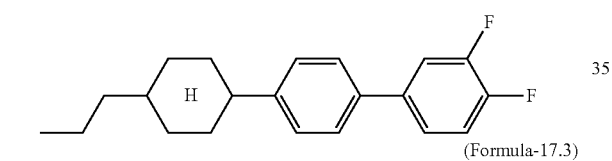

(Formula-17.3)

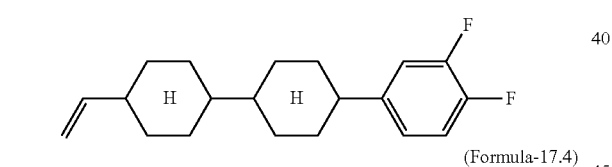

(Formula-17.4)

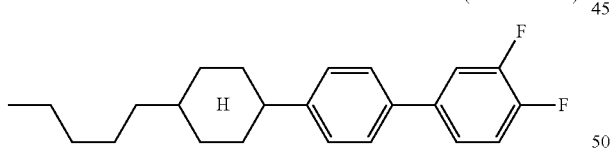

(in the formulae, a ring

[Chem. 17]

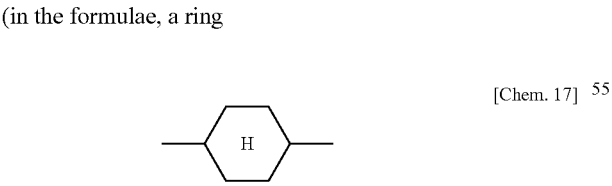

represents a 1,4-transcyclohexylene group). Although the types of compounds which can be combined are not particularly limited, one to four of these compounds are preferably contained, and one to three compounds are more preferably contained. The component (A) preferably contains such a compound in an amount of 6% by mass or more, more preferably 10% by mass or more, and still more preferably 17% by mass or more, relative to the total amount of the liquid crystal composition of the present invention.

The dielectrically positive component (A) in the liquid crystal composition of the present invention can further contain a compound selected from a compound group represented by (Formula-18.1) to (Formula-18.4),

[Chem. 18]

(Formula-18.1)

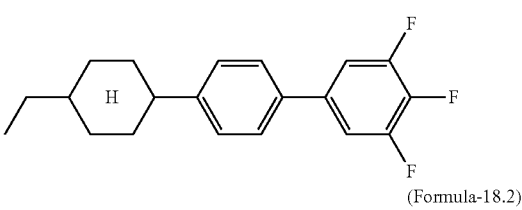

(Formula-18.2)

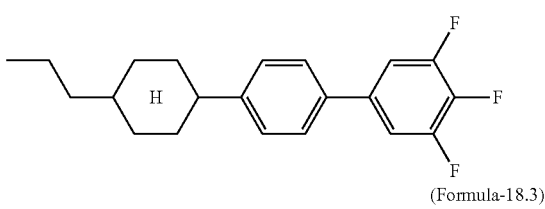

(Formula-18.3)

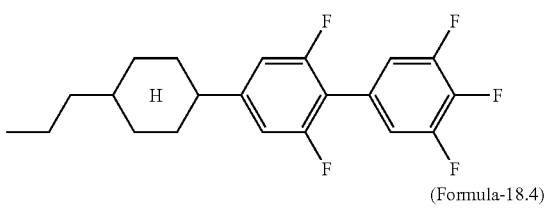

(Formula-18.4)

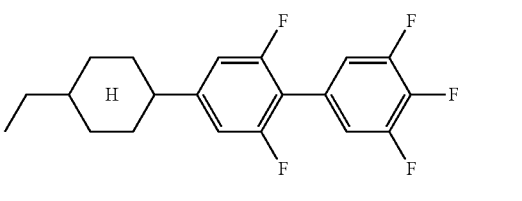

(in the formulae, a ring

[Chem. 19]

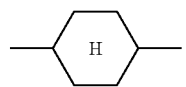

represents a 1,4-transcyclohexylene group). Although the types of compounds which can be combined are not particularly limited, one to four of these compounds are preferably contained, and one to three compounds are more preferably contained. The component (A) preferably contains such a compound in an amount of 15% by mass or more and less than 27% by mass, more preferably 15% by mass or more and less than 22% by mass, and still more preferably 17% by mass or more and less than 21% by mass, relative to the total amount of the liquid crystal composition of the present invention.

The dielectrically positive component (A) in the liquid crystal composition of the present invention can further contain a compound selected from a compound group represented by (Formula-19.1) to (Formula-19.4),

[Chem. 20]

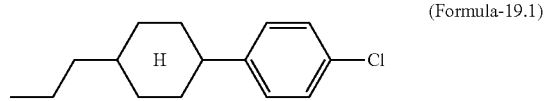
(Formula-19.1)

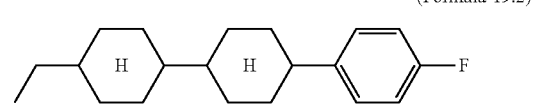
(Formula-19.2)

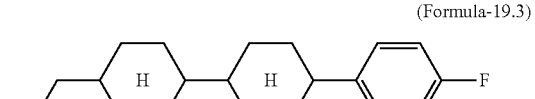
(Formula-19.3)

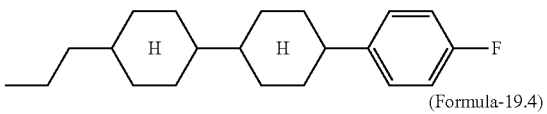
(Formula-19.4)

(in the formulae, a ring

[Chem. 21]

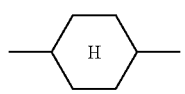

represents a 1,4-transcyclohexylene group). Although the types of compounds which can be combined are not particularly limited, one to four of these compounds are preferably contained, and one to three compounds are more preferably contained. The component (A) preferably contains a compound selected from the group consisting of compounds represented by (Formula-19.2) to (Formula-19.4) in an amount of 6% by mass or more, and more preferably 8% by mass or more, relative to the total amount of the liquid crystal composition of the present invention. Further, the component (A) preferably contains a compound represented by (Formula-19.1) in an amount of 0.5% by mass or more and less than 4% by mass relative to the total amount of the liquid crystal composition of the present invention.

The liquid crystal composition according to the present invention contains a dielectrically neutral component (B). Further, the component (B) contains a compound represented by (Formula-2),

[Chem. 22]

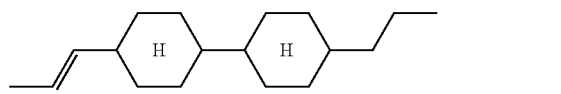
(Formula-2)

(in the formula, a ring

[Chem. 23]

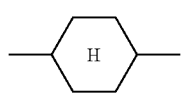

represents a 1,4-transcyclohexylene group). The content of a compound constituting the component (B) and represented by (Formula-2) in the liquid crystal composition of the present invention is preferably 4% by mass, more preferably 7% by mass or more, still more preferably 11% by mass or more, even still more preferably 14% by mass or more, even still more further preferably 19% by mass or more, and particularly preferably 24% by mass or more, relative to the total amount of the liquid crystal composition of the present invention.

The dielectrically neutral component (B) in the liquid crystal composition of the present invention preferably contains a compound represented by (Formula-3.1) or/and (Formula-3.2),

[Chem. 24]

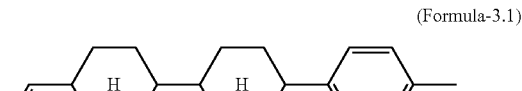
(Formula-3.1)

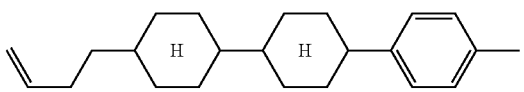
(Formula-3.2)

(in the formulae, a ring

[Chem. 25]

represents a 1,4-transcyclohexylene group).

The component (B) may contain a compound represented by (Formula-3.1), a compound represented by (Formula-3.2), or both a compound represented by (Formula-3.1) and a compound represented by (Formula-3.2). The content of a compound constituting the component (B) and represented by (Formula-3.1) is preferably 6% by mass, more preferably 9% by mass or more, still more preferably 14% by mass or more, even still more preferably 18% by mass or more, and particularly preferably 21% by mass or more, relative to the total amount of the liquid crystal composition of the present invention. The content of a compound constituting the component (B) and represented by (Formula-3.2) is preferably 3% by mass, more preferably 6% by mass or more, still more preferably 10% by mass or more, even still more preferably 14% by mass or more, and particularly preferably 17% by mass or more, relative to the total amount of the liquid crystal composition of the present invention. When the component (B) contains both a compound represented by (Formula-3.1) and a compound represented by (Formula-3.2), the total content of both compounds is preferably 15% by mass or more, more preferably 19% by mass or more, still more preferably 26% by mass or more, and particularly preferably 30% by mass or more, relative to the total amount of the liquid crystal composition of the present invention.

The dielectrically neutral component (B) in the liquid crystal composition of the present invention can further contain a compound selected from a compound group represented by (Formula-4.1) to (Formula-4.8),

[Chem. 26]

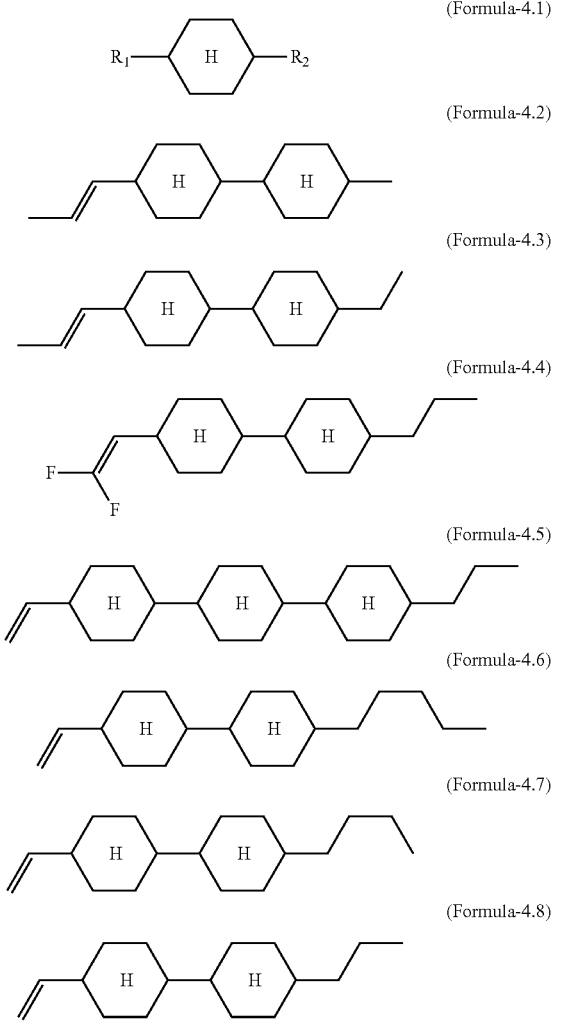

(Formula-4.1)
(Formula-4.2)
(Formula-4.3)
(Formula-4.4)
(Formula-4.5)
(Formula-4.6)
(Formula-4.7)
(Formula-4.8)

(in the formulae, R1 and R2 each independently represent a linear alkyl group or linear alkenyl group having 1 to 10 carbon atoms, and a ring

[Chem. 27]

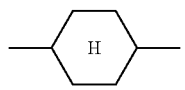

represents a 1,4-transcyclohexylene group). The component (B) may contain only one or two or more of these compounds, but preferably contains the compounds in proper combination according to the desired performance. For example, when low rotational viscosity is required, a combination including compounds represented by (Formula-4.1) and (Formula-4.8) or (Formula-4.7) may be selected, and, for example, when a high elastic constant is required, a combination including compounds represented by (Formula-4.2) and (Formula-4.3) may be selected, while when Tni is required, a combination including compounds represented by (Formula-4.5) and (Formula-4.6) may be selected. When the property of being easily soluble in the component (A) is required, a combination including a compound represented by (Formula-4.4) may be selected. Although the types of compounds which can be combined are not particularly limited, one to eight of these compounds are preferably contained, one to five compounds are more preferably contained, and one to three compounds are particularly preferably contained. The content thereof is preferably 19% by mass or more, more preferably 21% by mass, still more preferably 25% by mass, even still more preferably 34% by mass, even still more further preferably 57% by mass, and particularly preferably 61% by mass, relative to the total amount of the liquid crystal composition of the present invention.

Examples of a compound which can be preferably used as a compound represented by (Formula-4.1) include those given below.

[Chem. 28]

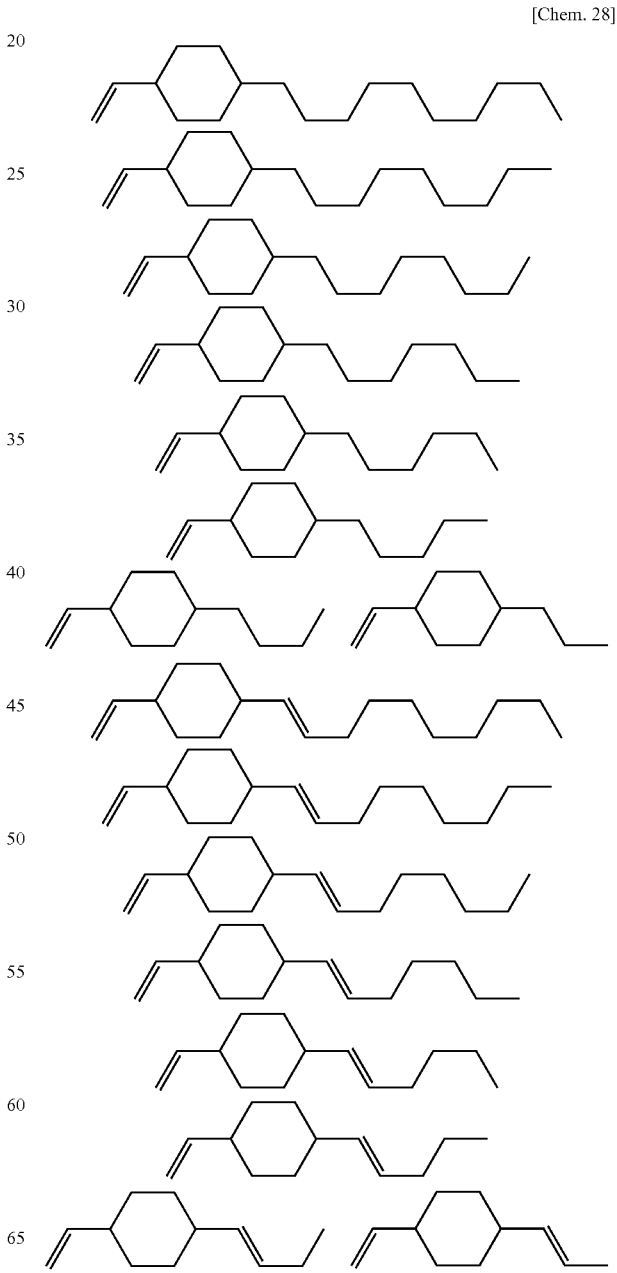

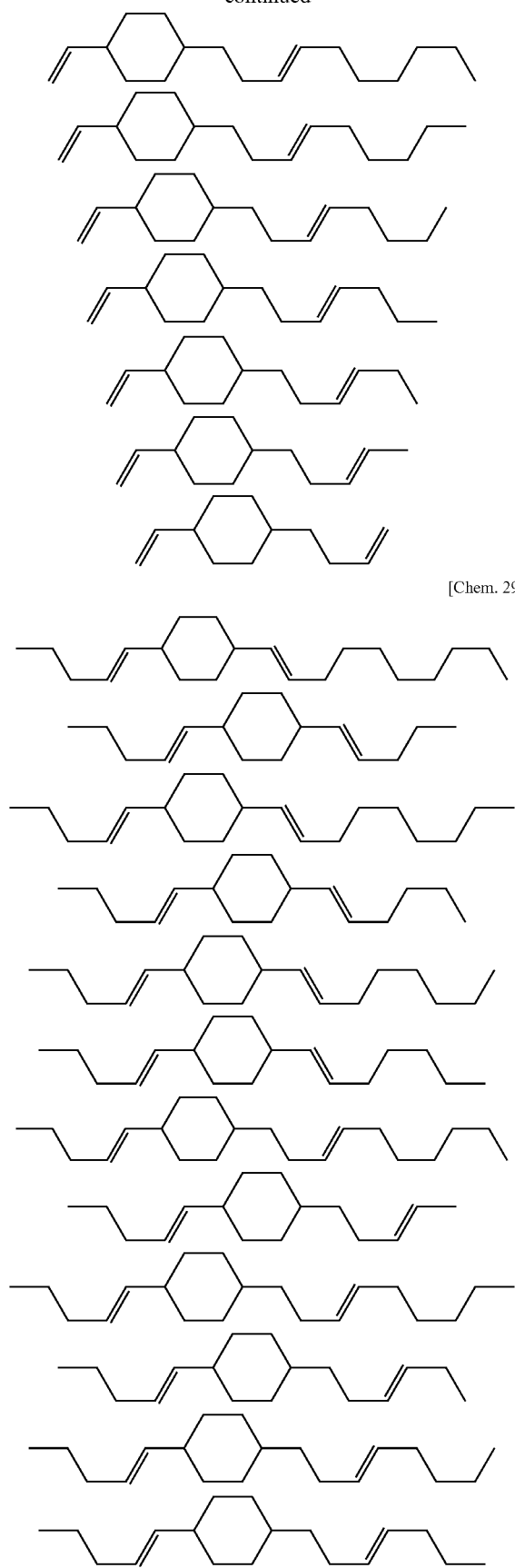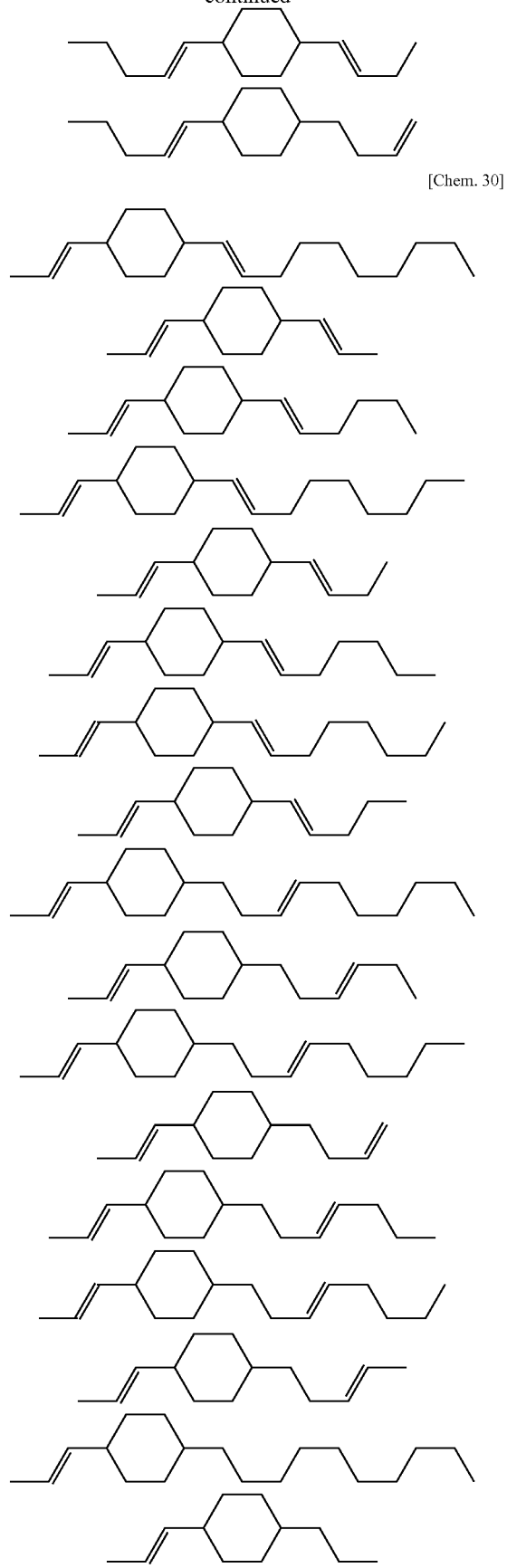

-continued
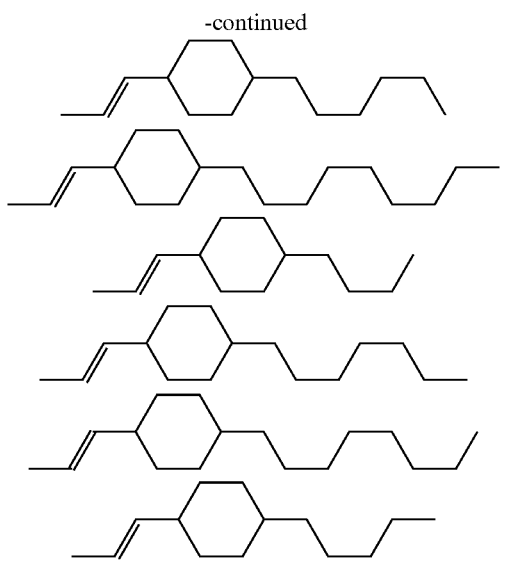
[Chem. 31]
-continued
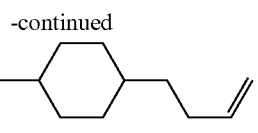
The dielectrically neutral component (B) in the liquid crystal composition of the present invention can further contain a compound selected from a compound group represented by (Formula-7.1) to (Formula-7.9),
[Chem. 32]
(Formula-7.1)
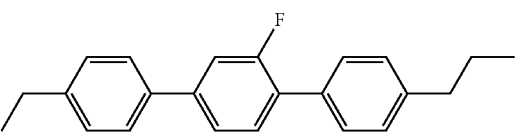
(Formula-7.2)
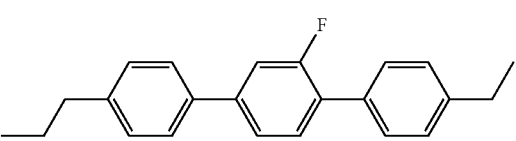
(Formula-7.3)
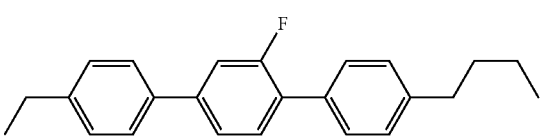
(Formula-7.4)
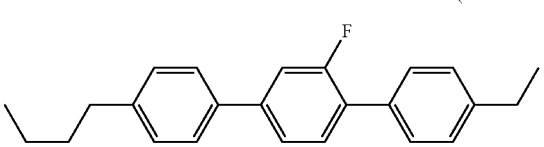
(Formula-7.5)
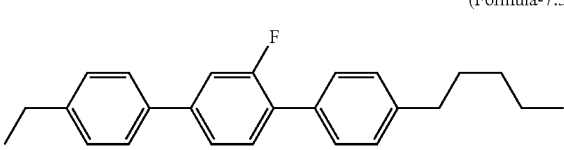
(Formula-7.6)
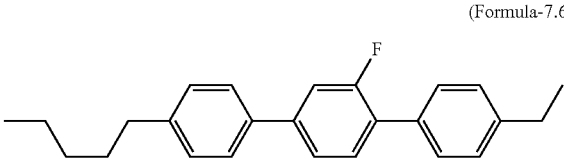
(Formula-7.7)
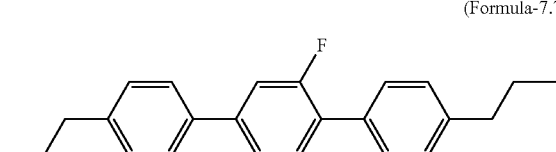
(Formula-7.8)
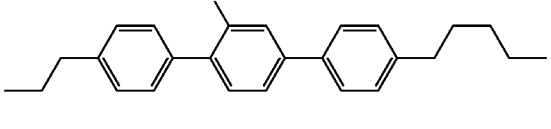

(Formula-7.9)

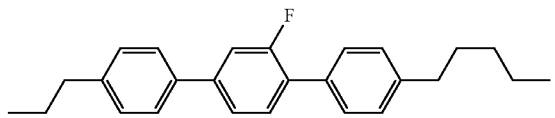

The component (B) may contain only one or two or more of these compounds, but preferably contains the compounds in proper combination according to the desired refractive index anisotropy and solubility at room temperature and below freezing point. Solubility is influenced by alkyl group structures at both ends of a compound, and thus requires attention. For example, the neutral component (B) preferably contains a compound represented by (Formula-7.1) or (Formula-7.2) in an amount of 12% by mass or more relative to the total amount of the liquid crystal composition of the present invention, the neutral component (B) preferably contains a compound represented by (Formula-7.3) or (Formula-7.4) in an amount of 0.5% by mass or more and less than 5% by mass relative to the total amount of the liquid crystal composition of the present invention, and the neutral component (B) preferably contains a compound selected from the group consisting of compounds represented by (Formula-7.5) to (Formula-7.9) in an amount of 7% by mass or more and less than 15% by mass, and more preferably 11% by mass or more and less than 14% by mass, relative to the total amount of the liquid crystal composition of the present invention. Although the types of compounds which can be combined are not particularly limited, one to five of these compounds are preferably contained, one or four compounds are more preferably contained, and one to three compounds are particularly preferably contained. Since it is also effective for solubility that a compound to be selected has a wide molecular weight distribution, for example, a compound represented by (Formula-7.1) or (Formula-7.2), a compound represented by (Formula-7.3) or (Formula-7.4), a compound represented by (Formula-7.5) or (Formula-7.6), and a compound represented by (Formula-7.8) or (Formula-7.9) are preferably selected in proper combination.

The dielectrically neutral component (B) in the liquid crystal composition of the present invention can further contain a compound represented by (Formula-8),

[Chem. 33]

(Formula-8)

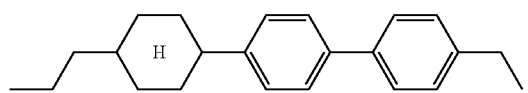

(in the formula, a ring

[Chem. 34]

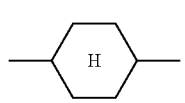

represents a 1,4-transcyclohexylene group). The component (B) preferably contains the compound in an amount of 6% by mass or more and 10% by mass or less relative to the total amount of the liquid crystal composition of the present invention.

The dielectrically neutral component (B) in the liquid crystal composition of the present invention can further contain a compound selected from a compound group represented by (Formula-11.1) to (Formula-11.3),

[Chem. 35]

(Formula-11.1)

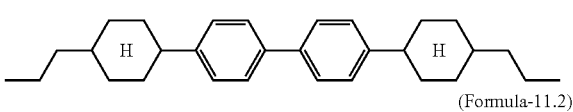

(Formula-11.2)

(Formula-11.3)

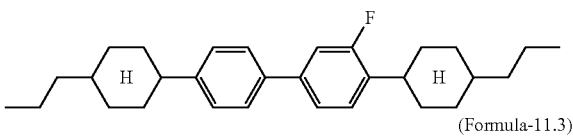

(in the formulae, a ring

[Chem. 36]

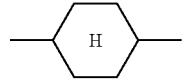

represents a 1,4-transcyclohexylene group). The component (B) preferably contains a compound selected from the compound group represented by (Formula-11.1) to (Formula-11.3) in an amount of 4% by mass or more, and more preferably 7% by mass or more, relative to the total amount of the liquid crystal composition of the present invention. Although the types of compounds which can be combined are not particularly limited, one to three of these compounds are preferably contained.

The dielectrically neutral component (B) in the liquid crystal composition of the present invention can further contain a compound selected from a compound group represented by (Formula-14.1) to (Formula-14.3),

[Chem. 37]

(Formula-14.1)

(Formula-14.2)

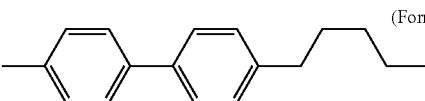

(Formula-14.3)

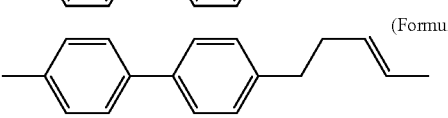

Although the types of compounds which can be combined are not particularly limited, one to four of the compounds are preferably contained, and one to three compounds are more preferably contained in view of refractive index anisotropy and Tni. The component (B) preferably contains a compound selected from the group consisting of compounds represented by (Formula-14.1) to (Formula-14.3) in an amount of 7% by mass or more, more preferably 11% by mass or more, and still more preferably 17% by mass or more, relative to the total amount of the liquid crystal composition of the present invention.

Examples of a compound which can be preferably used as a compound represented by (Formula-14.1) include those given below.

[Chem. 38]

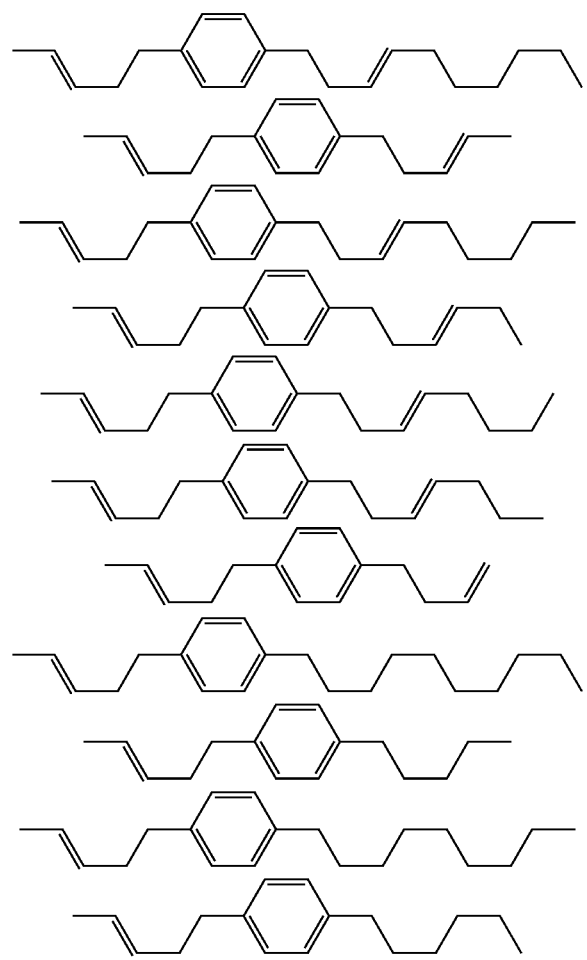

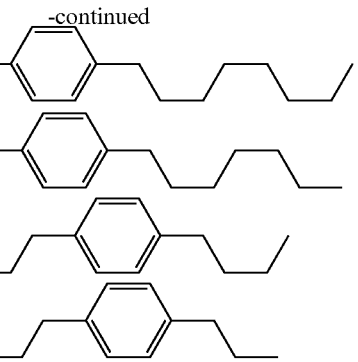

The dielectrically neutral component (B) in the liquid crystal composition of the present invention can further contain a compound selected from a compound group represented by (Formula-15.1) and (Formula-15.2),

[Chem. 39]

(Formula-15.1)

(Formula-15.2)

(in the formulae, a ring

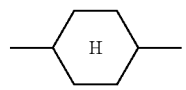

[Chem. 40]

represents a 1,4-transcyclohexylene group). Although the types of compounds which can be combined are not particularly limited, one or combination of two compounds is preferred. Further, in view of intended solubility, the content is preferably 6% by mass or more relative to the total amount of the liquid crystal composition of the present invention.

The dielectrically neutral component (B) in the liquid crystal composition of the present invention can further contain a compound selected from a compound group represented by (Formula-16.1) to (Formula-16.3),

[Chem. 41]

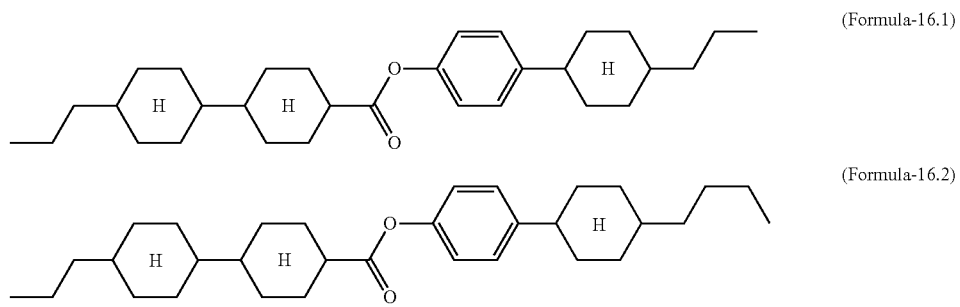

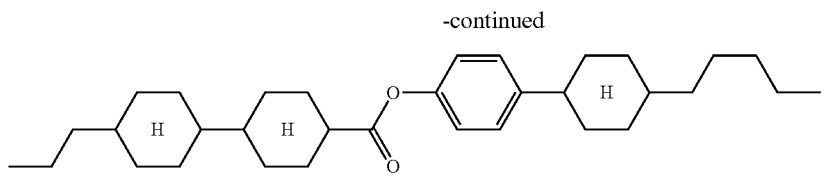
(Formula-16.3)

(in the formulae, a ring

[Chem. 42]

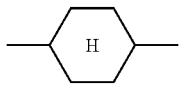

represents a 1,4-transcyclohexylene group). Although the types of compounds which can be combined are not particularly limited, the compounds are preferably used in proper combination in view of Tni, solubility, and Δn. In particular, one or combination of two or three compounds is preferably used.

The liquid crystal composition of the present invention containing 73% by mass or more of the component (A) or 81% by mass or more of the component (B) is also preferably used.

The liquid crystal composition of the present invention has Δ∈ at 25° C. of +3.5 or more, more preferably +3.5 to +20.0, and still more preferably +3.5 to +15.0. The Δn at 25° C. is 0.08 to 0.14 and preferably 0.09 to 0.13. In further detail, in application to a thin cell gap, the Δn at 25° C. is preferably 0.10 to 0.13, while in application to a thick cell gap, the Δn at 25° C. is preferably 0.08 to 0.10. η at 20° C. is preferably 10 to 45 mPa·s, more preferably 10 to 25 mPa·s, and particularly preferably 10 to 20 mPa·s. Tni is 60° C. to 120° C., preferably 70° C. to 110° C., and particularly preferably 75° C. to 90° C.

Besides the above-described compounds, the liquid crystal composition of the present invention may contain a usual nematic liquid crystal, smectic liquid crystal, cholesteric liquid crystal, or the like.

The liquid crystal composition of the present invention can contain a polymerizable compound for manufacturing a liquid crystal display device of a PS mode or the like. Usable polymerizable compounds include photopolymerizable monomers which are subjected to polymerization proceeding under energy rays such as light, for example, a polymerizable compound having as a structure a liquid crystal skeleton of a biphenyl derivative, a terphenyl derivative, or the like, in which a plurality of six-member rings are connected to each other. More specifically, a difunctional monomer represented by general formula (V) is preferred.

[Chem. 43]

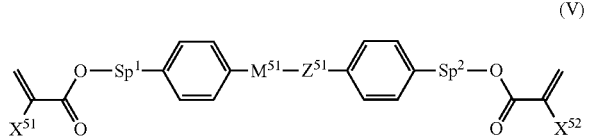
(V)

(In the formula, X51 and X52 each independently represent a hydrogen atom or a methyl group,
Sp1 and Sp2 each independently represent a single bond, an alkylene group having 1 to 8 carbon atoms, or —O—(CH2)s- (wherein s represents an integer of 2 to 7, and an oxygen atom is bonded to an aromatic ring),
Z51 represents —OCH2-, —CH2O—, —COO—, —OCO—, —CF2O—, —OCF2-, —CH2CH2-, —CF2CF2-, —CH═CH—COO—, —CH═CH—OCO—, —COO—CH═CH—, —OCO—CH═CH—, —COO—CH2CH2-, —OCO—CH2CH2-, —CH2CH2-COO—, —CH2CH2-OCO—, —COO—CH2-, —OCO—CH2-, —CH2-COO—, —CH2-OCO—, —CY1═CY2- (wherein Y1 and Y2 each independently represent a fluorine atom or a hydrogen atom), —C≡C—, or a single bond, M51 represents a 1,4-phenylene group, a trans-1,4-cyclohexylene group, or a single bond, and any hydrogen atom of all 1,4-phenylene groups in the formula may be substituted by a fluorine atom.)

Either a diacrylate derivative in which X51 and X52 both represent hydrogen atoms or a dimethacrylate derivative in which X51 and X52 both represent methyl groups is preferred, and a compound in which one of X51 and X52 represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

Sp1 and Sp2 each independently represent a single bond, an alkylene group having 1 to 8 carbon atoms, or —O—(CH2)s-, but at least one of Sp1 and Sp2 is preferably a single bond for a PSA display device. Specifically, a compound in which Sp1 and Sp2 both represent single bonds or a form in which one represents a single bond, and the other represents an alkylene group having 1 to 8 carbon atoms, or —O—(CH2)s- is preferred. In this case, a 1-4 alkyl group having 1 to 4 carbon atoms is preferred, and s is preferably 1 to 4.

Z51 is preferably —OCH2-, —CH2O—, —COO—, —OCO—, —CF2O—, —OCF2-, —CH2CH2-, —CF2CF2-, or a single bond, more preferably —COO—, —OCO—, or a single bond, and particularly preferably a single bond.

M51 represents a 1,4-phenylene group in which a desired hydrogen atom may be substituted by a fluorine atom, a trans-1,4-cyclohexylene group, or a single bond, but a 1,4-phenylene group or a single bond is preferred. When C represents a ring structure other than a single bond, Z51 is also preferably a linkage group other than a single bond, and when M51 is a single bond, Z51 is preferably a single bond.

In view of the above, specifically, a ring structure between Sp1 and Sp2 in the general formula (V) is preferably a structure described below.

In the general formula (V), when M51 represents a single bond, and the ring structure includes two rings, the ring structure is preferably represented by formula (Va-1) to formula (Va-5), more preferably represented by formula (Va-1) to formula (Va-3), and particularly preferably represented by formula (Va-1).

[Chem. 44]

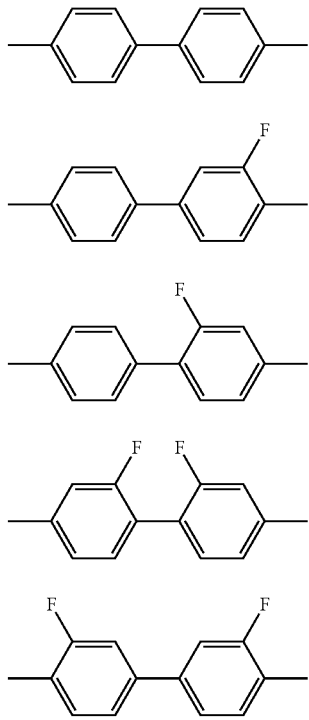

(Va-1)
(Va-2)
(Va-3)
(Va-4)
(Va-5)

(in the formulae, each end is bonded to Sp1 or Sp2).

A polymerizable compound having such a skeleton has alignment regulating force optimum for a PSA-type liquid crystal display device, and thus a good alignment state can be achieved, thereby suppressing display unevenness or causing no display unevenness.

In view of the above, polymerizable monomers of general formula (V-1) to general formula (V-4) are particularly preferred, and general formula (V-2) is most preferred.

[Chem. 45]

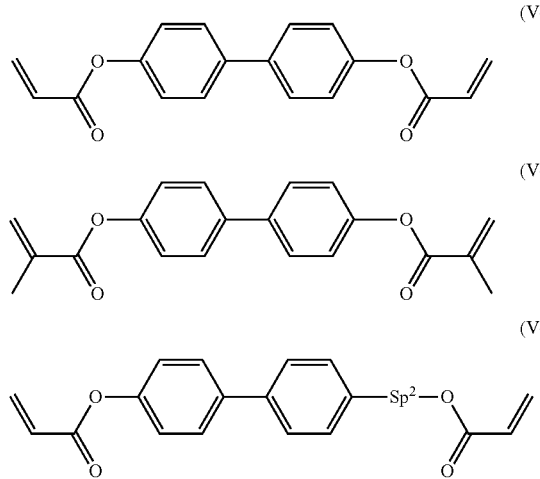

(V-1)
(V-2)
(V-3)

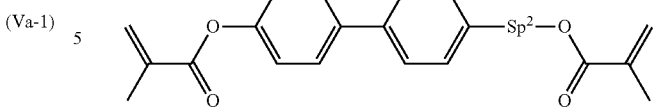

(V-4)

(In the formulae, Sp2 represents an alkylene group having 2 to 5 carbon atoms.)

When a monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (nematic liquid crystal display device), STN-LCD (super twisted nematic liquid crystal display device), and OCB-LCD, particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, a metal-insulator-metal resistivity element, or the like may be installed on the substrate.

The substrates are opposed to each other so that the transparent electrode layers face inward. In this case, the gap between the substrates may be adjusted through a spacer. The resulting light control layer is preferably adjusted to have a thickness of 1 to 100 μm. The thickness is more preferably 1.5 to 10 μm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a phase difference film can be used for widening the angle of view. Examples of the spacer include glass particles, plastic particles, alumina particles, columnar spacers composed of a photoresist material, and the like. Then, a sealing agent such as an epoxy-based curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates, but the vacuum injection method has the problem of leaving injection marks, in spite of causing no dropping marks. However, the present invention can preferably use the ODF method in a process for manufacturing a liquid crystal display device. In the process for manufacturing a liquid crystal display device by the ODF method, the liquid crystal display device can be manufactured by drawing a closed-loop bank-like form with an epoxy-based sealing agent, which can be cured with light and heat, on the substrate of one of a back plane or a front plane by using a dispenser, dropping a predetermined amount of the liquid crystal composition in the bank-like form under deaeration, and then bonding the front plane and the back plane. The liquid crystal composition of the present invention can be preferably used because the liquid crystal composition can be stably dropped in the ODF process.

Since an appropriate polymerization rate is desired for achieving good liquid crystal-aligning performance, a preferred method of polymerizing the polymerizable compound is a polymerization method in which the compound is polymerized by irradiation with one or two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a transverse electric field-type MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used as a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

A liquid crystal display device using the liquid crystal composition of the present invention is useful, particularly useful for a liquid crystal display device of active matrix driving, because both fast response and suppression of display defects are achieved, and the liquid crystal display device can be applied to a liquid crystal display device for a VA mode, a PSVA mode, or a TN mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{ni}$: nematic-isotropic liquid phase transition temperature (° C.)

Δn: refractive index anisotropy at 25° C.

Δ∈: dielectric anisotropy at 25° C.

η: is viscosity at 20° C. (mPa·s)

γ1: rotational viscosity at 25° C. (mPa·s)

VHR: voltage holding ratio (%) at 60° C. under the conditions of a frequency of 60 Hz and a voltage of 1 V applied Image Sticking:

Image sticking of a liquid crystal display device was evaluated by display of a predetermined fixed pattern within a display area for 1000 hours and then uniform display over the entire screen to visually observe the level of residual image of the fixed pattern based on the following 4 levels:

A: No residual image
B: Slight residual image at an allowable level
C: Residual image at an unallowable level
D: Significant residual image Dropping Marks:

Dropping marks of a liquid crystal display device were evaluated by visually observing white dropping marks appearing on the surface of a full black display based on the following 4 levels:

A: No residual image
B: Slight residual image at an allowable level
C: Residual image at an unallowable level
D: Significant residual image Process Adaptability:

Process adaptability was evaluated by, in the ODF process, dropping 50 pL of liquid crystal each 100000 times using a constant-volume measuring pump to measure a change in amount of the liquid crystal dropped 100 times during each of 0 to 100 times, 101 to 200 times, 201 to 300 times, . . . 99901 to 100000 times dropping based on the following four levels:

A: Very small change (enabling stable manufacture of a liquid crystal display device)
B: Slight change at an allowable level
C: Change at an unallowable level (degrading yield due to the occurrence of spots)
D: Significant change (causing liquid crystal leakage or vacuum air bubbles)

Solubility at Low Temperature:

Solubility at a low temperature was evaluated by, after preparing a liquid crystal composition, weighing 1 g of the liquid crystal composition in a 2-mL sample bottle, and continuously changing the temperature in a cycle of −20° C. (keeping for 1 hour), temperature rise (0.1° C./min), 0° C. (peeking for 1 hour), temperature rise (0.1° C./min) 20° C. (keeping for 1 hour), temperature drop (0.1° C./min), 0° C. (keeping for 1 hour), temperature drop (−0.1° C./min), and −20° C. to visually observe the occurrence of precipitates of the liquid crystal composition based on the following four levels:

A: No precipitates were observed for 600 hours or more

B: No precipitates were observed for 300 hours or more

C: Precipitates were observed within 150 hours

D: Precipitates were observed within 75 hours

In the examples, compounds are described by using abbreviations below.

(Ring Structure)

[Chem. 46]

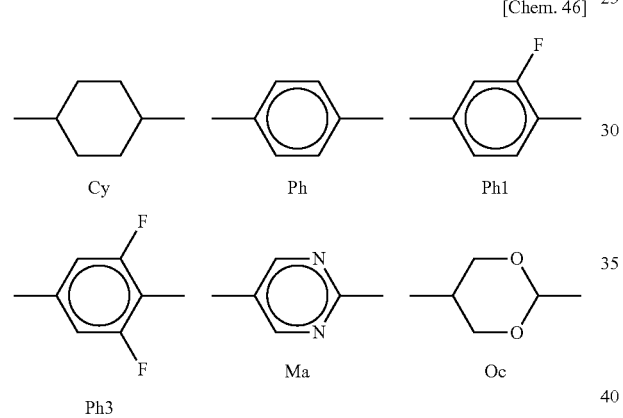

Cy, Ph, Ph1, Ph3, Ma, Oc

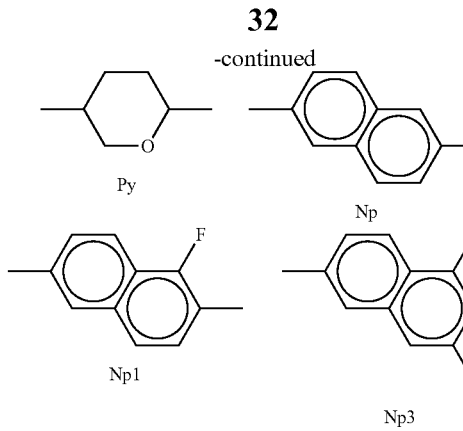

Py, Np, Np1, Np3

(Side Chain Structure and Linkage Structure)

TABLE 1

| N (number) at end | $C_nH_{2n+1}$— |
|---|---|
| -nd0FF- | —$(CH_2)_{n-1}$—HC=CFF |
| -2- | —$CH_2CH_2$— |
| -10- | —$CH_2O$— |
| -01- | —$OCH_2$— |
| —V— | —CO— |
| —VO— | —COO— |
| —CFFO— | —$CF_2O$— |
| —F | —F |
| —Cl | —Cl |
| —OCFFF | —$OCF_3$ |
| —CFFF | —$CF_3$ |
| -On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_m$— |
| -Ondm | —O—$(CH_2)_{n-1}$—HC=CH— |
| -ndm- | —$(CH_2)_{n-1}$—HC=CH—$(CH_2)_{m-1}$ |
| —CN | —C≡N |
| -T- | —C≡C— |

Example 1

A liquid crystal composition LC-1 described below was prepared.

[Chem. 47]

| Chemical structure | Ratio (%) | Abbreviation |
|---|---|---|
| | 35 | 3-Cy-Cy-1d0 |
| | 8 | 0d1-Cy-Cy-Ph-1 |
| | 11 | 2-Ph—Ph1—Ph-3 |
| | 11 | 2-Ph—Ph1—Ph-5 |

-continued

[Chem. 47]

| Chemical structure | Ratio (%) | Abbreviation |
|---|---|---|
|  | 16 | 3-Cy-Cy-1d1 |
| 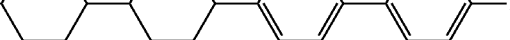 | 6 | 3-Cy-Cy-Ph—Ph3—F |
|  | 9 | 3-Ph—Ph3—CFFO—Ph3—F |
|  | 4 | 4-Ph—Ph1—Ph3—CFFO—Ph3—F |

Physical property values of LC-1 were as follows.

TABLE 2

| Tni/° C. | 81.1 |
|---|---|
| Δn | 0.116 |
| Δε | 4.1 |
| η/mPa·s | 11 |
| γ1/mPa·s | 44 |

The liquid crystal composition LC-1 showed an initial VHR of 99.2, but a VHR of 98.8% after being allowed to stand at a high temperature of 150° C. for 1 hour. Evaluation of solubility at a low temperature indicated excellent performance as shown in a table below. Also, a TN liquid crystal display device was manufactured by the ODF process using the liquid crystal composition LC-1 and evaluated with respect to image sticking, dropping marks, and process adaptability by the methods described above. As a result, excellent results were obtained as shown below.

TABLE 3

| Evaluation of image sticking | A |
|---|---|
| Evaluation of dropping marks | A |
| Evaluation of process adaptability | A |
| Evaluation of low-temperature solubility | A |

Comparative Example 1

A liquid crystal composition LC-2 shown below and not containing a compound represented by (Formula-2) was prepared.

[Chem. 48]

| Chemical structure | Ratio (%) | Abbreviation |
|---|---|---|
| 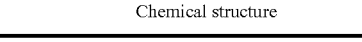 | 35 | 3-Cy-Cy-1d0 |
|  | 8 | 0d1-Cy-Cy-Ph-1 |

-continued

[Chem. 48]

| Chemical structure | Ratio (%) | Abbreviation |
|---|---|---|
| 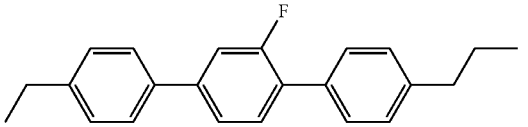 | 11 | 2-Ph—Ph1—Ph-3 |
| 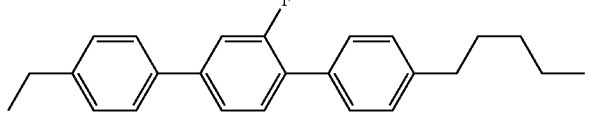 | 11 | 2-Ph—Ph1—Ph-5 |
| 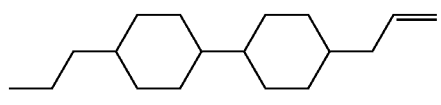 | 16 | 3-Cy-Cy-2d0 |
| 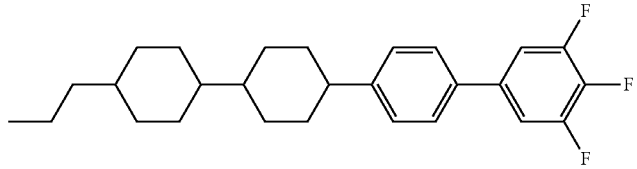 | 6 | 3-Cy-Cy-Ph—Ph3—F |
| 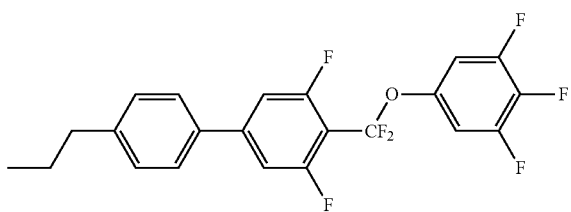 [SMILES: CCCc1ccc(-c2cc(F)c(C(F)(F)Oc3cc(F)c(F)c(F)c3)c(F)c2)cc1] | 9 | 3-Ph—Ph3—CFFO—Ph3—F |
| 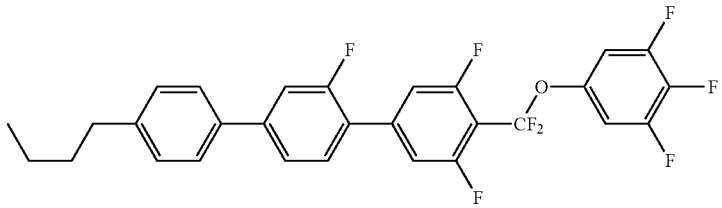 [SMILES: CCCCc1ccc(-c2ccc(-c3cc(F)c(C(F)(F)Oc4cc(F)c(F)c(F)c4)c(F)c3)c(F)c2)cc1] | 4 | 4-Ph—Ph1—Ph3—CFFO—Ph3—F |

Physical property values of LC-2 were as below.

TABLE 4

| | |
|---|---|
| Tni/° C. | 80.1 |
| Δn | 0.116 |
| Δε | 4.1 |
| η/mPa·s | 13 |
| γ1/mPa·s | 47 |

The liquid crystal composition LC-2 not containing a compound represented by (Formula-2) showed increases in viscosity η and rotational viscosity γ1 as compared with the liquid crystal composition LC-1 containing a compound represented by (Formula-2). The liquid crystal composition LC-2 showed an initial VHR of 99.0%, but a VHR of 94.7% after being allowed to stand at a high temperature of 150° C. for 1 hour. Evaluation of solubility at a low temperature indicated precipitation earlier than LC-1 as shown in a table below.

Also, a TN liquid crystal display device was manufactured by using the liquid crystal composition LC-2 and evaluated with respect to image sticking, dropping marks, and process adaptability by the methods described above. As a result, results inferior to Example 1 were obtained as shown below.

TABLE 5

| | |
|---|---|
| Evaluation of image sticking | C |
| Evaluation of dropping marks | D |
| Evaluation of process adaptability | D |
| Evaluation of low-temperature solubility | C |

Example 2

A liquid crystal composition LC-3 described below was prepared.

| Chemical structure | Ratio (%) | Abbreviation |
|---|---|---|
| 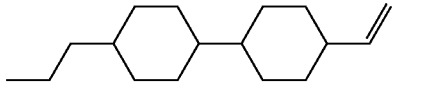 | 37 | 3-Cy-Cy-1d0 |
| 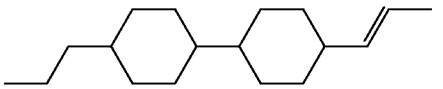 [SMILES: C/C=C/C1CCC(C2CCC(CCC)CC2)CC1] | 12 | 3-Cy-Cy-1d1 |
| 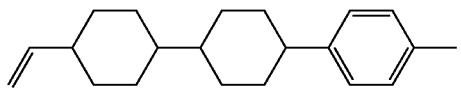 [SMILES: C=CC1CCC(C2CCC(c3ccc(C)cc3)CC2)CC1] | 4 | 0d1-Cy-Cy-Ph-1 |
| 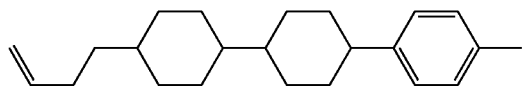 | 9 | 0d3-Cy-Cy-Ph-1 |
| 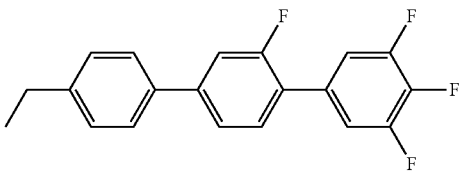 [SMILES: CCc1ccc(-c2ccc(-c3cc(F)c(F)c(F)c3)c(F)c2)cc1] | 5 | 2-Ph—Ph1—Ph3—F |
| 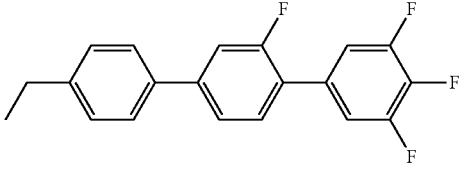 [SMILES: CCc1ccc(-c2ccc(-c3cc(F)c(F)c(F)c3)c(F)c2)cc1] | 9 | 3-Ph—Ph1—Ph3—F |
| 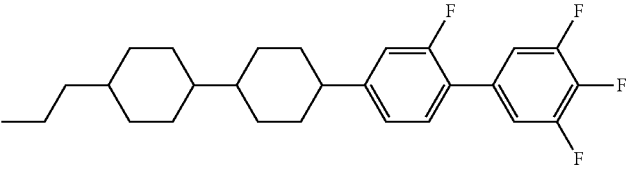 [SMILES: CCCC1CCC(C2CCC(c3ccc(-c4cc(F)c(F)c(F)c4)c(F)c3)CC2)CC1] | 9 | 3-Cy-Cy-Ph1—Ph3—F |
| 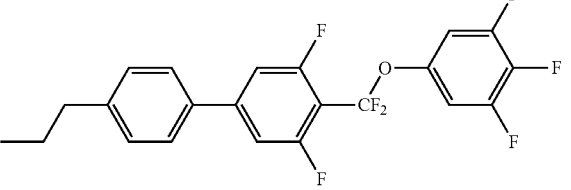 | 10 | 3-Ph—Ph3—CFFO—Ph3—F |
| 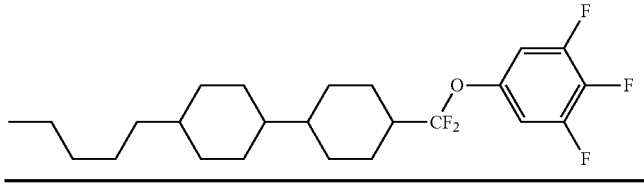 | 5 | 5-Cy-Cy-CFFO—Ph3—F |
Physical property values of LC-3 were as follows.
TABLE 6
| | |
|---|---|
| Tni/° C. | 76.0 |
| Δn | 0.100 |
| Δε | 6.9 |
| η/mPa·s | 12 |
| γ1/mPa·s | 49 |
The liquid crystal composition LC-3 showed an initial VHR of 99.5%, but a VHR of 98.5% after being allowed to stand at a high temperature of 150° C. for 1 hour. Evaluation of solubility at a low temperature indicated excellent performance as shown in a table below. Also, a TN liquid crystal display device was manufactured by the ODF process using the liquid crystal composition LC-3 and evaluated with respect to image sticking, dropping marks, and process adaptability by the methods described above. As a result, excellent results were obtained as shown below.

TABLE 7

| | |
|---|---|
| Evaluation of image sticking | A |
| Evaluation of dropping marks | A |

TABLE 7-continued

| | |
|---|---|
| Evaluation of process adaptability | A |
| Evaluation of low-temperature solubility | A |

Comparative Example 2

Liquid crystal composition LC-4 shown below and not containing a compound represented by (Formula-1) was prepared.

[Chem. 50]

| Chemical structure | Ratio (%) | Abbreviation |
|---|---|---|
| | 37 | 3-Cy-Cy-1d0 |
| | 12 | 3-Cy-Cy-1d1 |
| | 4 | 0d1-Cy-Cy-Ph-1 |
| | 9 | 0d3-Cy-Cy-Ph-1 |
| | 5 | 2-Ph—Ph1—Ph3—F |
| | 9 | 3-Ph—Ph1—Ph3—F |
| | 9 | 3-Cy-Cy-Ph1—Ph3—F |
| | 10 | 4-Ph—Ph3—CFFO—Ph3—F |

-continued

[Chem. 50]

| Chemical structure | Ratio (%) | Abbreviation |
|---|---|---|
| (structure: 5-Cy-Cy-CFFO—Ph3—F) | 5 | 5-Cy-Cy-CFFO—Ph3—F |

Physical property values of LC-4 were as below.

TABLE 8

| | |
|---|---|
| Tni/° C. | 75.5 |
| Δn | 0.099 |
| Δε | 6.8 |
| η/mPa · s | 12 |
| γ1/mPa · s | 52 |

The liquid crystal composition LC-4 not containing a compound represented by (Formula-1) showed an increase in rotational viscosity γ1 as compared with the liquid crystal composition LC-3 containing a compound represented by (Formula-1). The liquid crystal composition LC-4 showed an initial VHR of 99.5%, but a VHR of 96.0% after being allowed to stand at a high temperature of 150° C. for 1 hour. Evaluation of solubility at a low temperature indicated precipitation earlier than LC-3 as shown in a table below.

Also, a TN liquid crystal display device was manufactured by using the liquid crystal composition LC-4 and evaluated with respect to image sticking, dropping marks, and process adaptability by the methods described above. As a result, results inferior to Example 2 were obtained as shown below.

TABLE 9

| | |
|---|---|
| Evaluation of image sticking | C |
| Evaluation of dropping marks | D |
| Evaluation of process adaptability | C |
| Evaluation of low-temperature solubility | D |

Example 3 and Example 4

Liquid crystal compositions LC-5 and LC-6 described below were prepared, and physical property values thereof were measured. The results are shown in a table below.

TABLE 10

| Chemical structure | Ratio (%) |
|---|---|
| LC-5 | |
| 3-Cy-Cy-1d0 | 34 |
| 3-Cy-Cy-1d1 | 15 |
| 1-Ph—Ph-5 | 12 |
| 0d1-Cy-Cy-Ph-1 | 8 |
| 2-Ph—Ph1—Ph-3 | 8 |
| 2-Ph—Ph1—Ph-5 | 9 |
| 3-Ph—Ph3—CFFO—Ph3—F | 5 |
| 3-Ph—Ph1—Ph3—CFFO—Ph3—F | 5 |
| 3-Cy-Ph—Ph3—Ph1—OCFFF | 4 |
| Tni/° C. | 75.3 |
| Δn | 0.121 |
| Δε | 3.6 |
| γ1/mPa · s | 41 |
| η/mPa · s | 11 |
| LC-6 | |
| 3-Cy-Cy-1d0 | 48 |
| 3-Cy-Cy-1d1 | 4 |
| 1-Ph—Ph-3d1 | 8 |
| 2-Ph—Ph1—Ph-3 | 8 |
| 3-Ph—Ph1—Ph-3 | 7 |
| 3-Ph—Ph3—CFFO—Ph3—F | 4 |
| 3-Ph—Ph1—Ph3—CFFO—Ph3—F | 5 |
| 4-Cy-Cy-Ph1—CFFO—Ph3—F | 10 |
| 3-Cy-Ph—Ph3—Ph1—OCFFF | 6 |
| Tni/° C. | 76.1 |
| Δn | 0.110 |
| Δε | 5.9 |
| γ1/mPa · s | 45 |
| η/mPa · s | 13 |

The liquid crystal compositions LC-5 and LC-6 had good low-temperature solubility and showed substantially no change of initial VHR after being allowed to stand at a high temperature of 150° C. for 1 hour. Also, TN liquid crystal display devices were manufactured by using the liquid crystal compositions LC-5 and LC-6 and evaluated with respect to image sticking, dropping marks, and process adaptability. As a result, excellent results were obtained as shown below.

TABLE 11

| | LC-5 | LC-6 |
|---|---|---|
| Initial VHR (%) | 98.6 | 98.5 |
| VHR after 1 hour at 150° C. | 98.3 | 98.3 |
| Evaluation of image sticking | A | A |
| Evaluation of dropping marks | A | A |
| Evaluation of process adaptability | A | A |
| Evaluation of low-temperature solubility | A | A |

Example 5 and Example 6

Liquid crystal compositions LC-7 and LC-8 described below were prepared, and physical property values thereof were measured. The results are shown in a table below.

TABLE 12

| Chemical structure | Ratio (%) |
|---|---|
| LC-7 | |
| 3-Cy-Cy-1d0 | 15 |
| 3-Cy-Cy-1d1 | 2 |

TABLE 12-continued

| Chemical structure | Ratio (%) |
|---|---|
| 0d1-Cy-Cy-Ph-1 | 4 |
| 2-Ph—Ph1—Ph-3 | 7 |
| 2-Ph—Ph1—Ph-4 | 7 |
| 2-Cy-Cy-Ph3—F | 8 |
| 2-Cy-Ph—Ph3—F | 9 |
| 3-Cy-Cy-Ph—OCFFF | 14 |
| 3-Ph—Ph3—CFFO—Ph3—F | 11 |
| 3-Cy-Cy-CFFO—Ph3—F | 9 |
| 5-Cy-Cy-CFFO—Ph3—F | 8 |
| 3-Cy-Cy-Ph1—Ph3—F | 3 |
| 3-Cy-Ph—Ph1-Cy-3 | 3 |
| Tni/° C. | 91.1 |
| $\Delta n$ | 0.112 |
| $\Delta \epsilon$ | 8.9 |
| $\gamma 1$/mPa·s | 81 |
| $\eta$/mPa·s | 17 |
| LC-8 | |
| 3-Cy-Cy-1d0 | 22 |
| 3-Cy-Cy-1d1 | 6 |
| 0d1-Cy-Cy-Ph-1 | 8 |
| 3-Cy-Cy-VO—Ph-Cy-3 | 4 |
| 3-Ph—Ph3—CFFO—Ph3—F | 15 |
| 3-Cy-Cy-CFFO—Ph3—F | 7 |
| 5-Cy-Cy-CFFO—Ph3—F | 8 |
| 3-Ph—Ph1—Ph3—CFFO—Ph3—F | 7 |
| 2-Py—Ph—Ph3—CFFO—Ph3—F | 7 |
| 3-Py—Ph—Ph3—CFFO—Ph3—F | 8 |
| 3-Cy-Ph—Ph3—Ph1—OCFFF | 6 |
| 3-Ph—Ph—Ph1—Ph3—F | 2 |
| Tni/° C. | 98.6 |
| $\Delta n$ | 0.121 |
| $\Delta \epsilon$ | 19.4 |
| $\gamma 1$/mPa·s | 168 |
| $\eta$/mPa·s | 30 |

The liquid crystal compositions LC-7 and LC-8 had good low-temperature solubility and showed substantially no change of initial VHR after being allowed to stand at a high temperature of 150° C. for 1 hour. Also, TN liquid crystal display devices were manufactured by using the liquid crystal compositions LC-7 and LC-8 and evaluated with respect to image sticking, dropping marks, and process adaptability. As a result, excellent results were obtained as shown below.

TABLE 13

| | LC-7 | LC-8 |
|---|---|---|
| Initial VHR (%) | 98.0 | 98.3 |
| VHR after 1 hour at 150° C. | 97.5 | 97.7 |
| Evaluation of image sticking | A | A |
| Evaluation of dropping marks | A | A |
| Evaluation of process adaptability | A | A |
| Evaluation of low-temperature solubility | A | A |

Example 7 and Example 8

Liquid crystal compositions LC-9 and LC-10 described below were prepared, and physical property values thereof were measured. The results are shown in a table below.

TABLE 14

| Chemical structure | Ratio (%) |
|---|---|
| LC-9 | |
| 3-Cy-Cy-1d1 | 5 |
| 5-Cy-Cy-1d0 | 21 |
| 5-Cy-Ph—O2 | 5 |

TABLE 14-continued

| Chemical structure | Ratio (%) |
|---|---|
| 0d1-Cy-Cy-Ph-1 | 14 |
| 3-Cy-Cy-VO—Ph-Cy-3 | 3 |
| 3-Cy-Cy-VO—Ph-Cy-4 | 3 |
| 3-Cy-Cy-VO—Ph-Cy-5 | 3 |
| 2-Cy-Ph—Ph3—F | 5 |
| 2-Cy-Ph—Ph3—F | 5 |
| 3-Cy-Cy-CFFO—Ph3—F | 17 |
| 2-Cy-Cy-CFFO—Ph3—F | 6 |
| 3-Ph—Ph3—CFFO—Ph3—F | 7 |
| 2-Ph—Ph3—CFFO—Ph3—F | 6 |
| Tni/° C. | 100.0 |
| $\Delta n$ | 0.095 |
| $\Delta \epsilon$ | 6.0 |
| $\gamma 1$/mPa·s | 95 |
| $\eta$/mPa·s | 19 |
| LC-10 | |
| 3-Cy-Cy-1d0 | 44 |
| 3-Cy-Cy-1d1 | 6 |
| 1-Ph—Ph-3d1 | 6 |
| 3-Cy-Ph—Ph-2 | 9 |
| 3-Ph—Ph1—Ph-3 | 8 |
| 3-Cy-Ph—Ph1—F | 7 |
| 5-Cy-Ph—Ph1—F | 5 |
| 3-Cy-Cy-Ph1—Ph3—F | 5 |
| 3-Ph—Ph3—CFFO—Ph3—F | 6 |
| 3-Ph—Ph1—Ph3—CFFO—Ph3—F | 4 |
| Tni/° C. | 76.4 |
| $\Delta n$ | 0.112 |
| $\Delta \epsilon$ | 4.7 |
| $\gamma 1$/mPa·s | 44 |
| $\eta$/mPa·s | 12 |

The liquid crystal compositions LC-9 and LC-10 had good low-temperature solubility and showed substantially no change of initial VHR after being allowed to stand at a high temperature of 150° C. for 1 hour. Also, TN liquid crystal display devices were manufactured by using the liquid crystal compositions LC-9 and LC-10 and evaluated with respect to image sticking, dropping marks, and process adaptability. As a result, excellent results were obtained as shown below.

TABLE 15

| | LC-9 | LC-10 |
|---|---|---|
| Initial VHR (%) | 98.0 | 98.3 |
| VHR after 1 hour at 150° C. | 97.5 | 97.7 |
| Evaluation of image sticking | A | A |
| Evaluation of dropping marks | A | A |
| Evaluation of process adaptability | A | A |
| Evaluation of low-temperature solubility | A | A |

Example 9 and Example 10

Liquid crystal compositions LC-11 and LC-12 described below were prepared, and physical property values thereof were measured. The results are shown in a table below.

TABLE 16

| Chemical structure | Ratio (%) |
|---|---|
| LC-11 | |
| 3-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph-4 | 3 |
| 2-Cy-Cy-Ph3—F | 8 |

TABLE 16-continued

| Chemical structure | Ratio (%) |
|---|---|
| 2-Cy-Ph—Ph3—F | 3 |
| 2-Cy-Ph—Ph3—F | 9 |
| 3-Cy-Cy-Ph—OCFFF | 14 |
| 3-Ph—Ph3—CFFO—Ph3—F | 11 |
| 3-Cy-Cy-CFFO—Ph3—F | 9 |
| 5-Cy-Cy-CFFO—Ph3—F | 8 |
| 3-Cy-Cy-Ph1—Ph3—F | 3 |
| Tni/° C. | 90.2 |
| Δn | 0.098 |
| Δε | 9.1 |
| γ1/mPa·s | 76 |
| η/mPa·s | 17 |
| LC-12 | |
| 3-Cy-Cy-1d0 | 10 |
| 3-Cy-Cy-1d0FF | 28 |
| 3-Cy-Cy-1d1 | 6 |
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-CFFO—Ph3—F | 6 |
| Tni/° C. | 80.0 |
| Δn | 0.110 |
| Δε | 4.0 |
| γ1/mPa·s | 45 |
| η/mPa·s | 11 |

The liquid crystal compositions LC-11 and LC-12 had good low-temperature solubility and showed substantially no change of initial VHR after being allowed to stand at a high temperature of 150° C. for 1 hour. Also, TN liquid crystal display devices were manufactured by using the liquid crystal compositions LC-11 and LC-12 and evaluated with respect to image sticking, dropping marks, and process adaptability. As a result, excellent results were obtained as shown below.

TABLE 17

| | LC-11 | LC-12 |
|---|---|---|
| Initial VHR (%) | 98.0 | 99.5 |
| VHR after 1 hour at 150° C. | 97.1 | 99.2 |
| Evaluation of image sticking | A | A |
| Evaluation of dropping marks | A | A |
| Evaluation of process adaptability | A | A |
| Evaluation of low-temperature solubility | A | A |

Example 11 and Example 12

Liquid crystal compositions LC-13 and LC-14 described below were prepared, and physical property values thereof were measured. The results are shown in a table below.

TABLE 18

| Chemical structure | Ratio (%) |
|---|---|
| LC-13 | |
| 3-Cy-Cy-1d0 | 28 |
| 3-Cy-Cy-1d1 | 15 |
| 0d1-Cy-Cy-Ph-1 | 10 |
| 0d3-Cy-Cy-Ph-1 | 14 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph1—Ph3—CFFO—Ph3—F | 2 |
| 2-Py—Ph—Ph3—CFFO—Ph3—F | 3 |

TABLE 18-continued

| Chemical structure | Ratio (%) |
|---|---|
| 3-Py—Ph—Ph3—CFFO—Ph3—F | 6 |
| 3-Ph—Ph—Ph1—Ph3—F | 1 |
| Tni/° C. | 85.5 |
| Δn | 0.102 |
| Δε | 6.7 |
| γ1/mPa·s | 53 |
| η/mPa·s | 15 |
| LC-14 | |
| 3-Cy-Cy-1d0 | 42 |
| 3-Cy-Cy-1d1 | 9 |
| 0d3-Cy-Cy-Ph-1 | 5 |
| 3-Cy-Ph—Ph-2 | 7 |
| 2-Ph—Ph1—Ph-3 | 4 |
| 2-Ph—Ph1—Ph-4 | 4 |
| 3-Cy-Ph—Ph-Cy-3 | 4 |
| 3-Ph—Ph3—CFFO—Ph3—F | 3 |
| 3-Ph—Ph1—Ph3—F | 9 |
| 3-Cy-Cy-Ph1—Ph3—F | 3 |
| 3-Cy-Ph—Cl | 3 |
| 2-Ph—Ph3—Ph3—F | 7 |
| Tni/° C. | 75.2 |
| Δn | 0.110 |
| Δε | 4.1 |
| γ1/mPa·s | 40 |
| η/mPa·s | 10 |

The liquid crystal compositions LC-13 and LC-14 had good low-temperature solubility and showed substantially no change of initial VHR after being allowed to stand at a high temperature of 150° C. for 1 hour. Also, TN liquid crystal display devices were manufactured by using the liquid crystal compositions LC-13 and LC-14 and evaluated with respect to image sticking, dropping marks, and process adaptability. As a result, excellent results were obtained as shown below.

TABLE 19

| | LC-13 | LC-14 |
|---|---|---|
| Initial VHR (%) | 98.5 | 99.5 |
| VHR after 1 hour at 150° C. | 98.0 | 99.0 |
| Evaluation of image sticking | A | A |
| Evaluation of dropping marks | A | A |
| Evaluation of process adaptability | A | A |
| Evaluation of low-temperature solubility | A | A |

Example 14 and Example 15

Liquid crystal compositions LC-15 and LC-16 described below were prepared, and physical property values thereof were measured. The results are shown in a table below.

TABLE 20

| Chemical structure | Ratio (%) |
|---|---|
| LC-15 | |
| 3-Cy-Cy-1d0 | 47 |
| 3-Cy-Cy-1d1 | 7 |
| 2-Ph—Ph1—Ph-3 | 14 |
| 2-Ph—Ph1—Ph-5 | 9 |
| 2-Cy-Ph—Ph—F | 2 |
| 3-Cy-Ph—Ph—F | 6 |
| 3-Ph—Ph3—CFFO—Ph3—F | 6 |
| 2-Cy-Cy-Ph—Ph3—F | 4 |
| 3-Cy-Cy-Ph—Ph3—F | 5 |
| Tni/° C. | 75.7 |
| Δn | 0.110 |
| Δε | 3.5 |

TABLE 20-continued

| Chemical structure | Ratio (%) |
|---|---|
| γ1/mPa · s | 39 |
| η/mPa · s | 11 |
| LC-16 | |
| 3-Cy-Cy-1d0 | 41 |
| 3-Cy-Cy-1d1 | 7 |
| 0d1-Cy-Cy-Ph-1 | 11 |
| 2-Ph—Ph1—Ph-3 | 11 |
| 2-Ph—Ph1—Ph-5 | 11 |
| 3-Ph—Ph3—CFFO—Ph3—F | 9 |
| 4-Ph—Ph1—Ph3—CFFO—Ph3—F | 4 |
| 3-Cy-Cy-Ph—Ph3—F | 6 |
| Tni/° C. | 80.8 |
| Δn | 0.116 |
| Δε | 4.3 |
| γ1/mPa · s | 45 |
| η/mPa · s | 12 |

The liquid crystal compositions LC-15 and LC-16 had good low-temperature solubility and showed substantially no change of initial VHR after being allowed to stand at a high temperature of 150° C. for 1 hour. Also, TN liquid crystal display devices were manufactured by using the liquid crystal compositions LC-15 and LC-16 and evaluated with respect to image sticking, dropping marks, and process adaptability. As a result, excellent results were obtained as shown below.

TABLE 21

| | LC-15 | LC-16 |
|---|---|---|
| Initial VHR (%) | 99.7 | 99.5 |
| VHR after 1 hour at 150° C. | 99.5 | 99.2 |
| Evaluation of image sticking | A | A |
| Evaluation of dropping marks | A | A |
| Evaluation of process adaptability | A | A |
| Evaluation of low-temperature solubility | A | A |

Example 16 and Example 17

Liquid crystal compositions LC-17 and LC-18 described below were prepared, and physical property values thereof were measured. The results are shown in a table below.

TABLE 22

| Chemical structure | Ratio (%) |
|---|---|
| LC-17 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 0d1-Cy-Cy-Ph1—F | 8 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 3-Cy-Cy-Ph1—Ph3—F | 9 |
| 2-Ph—Ph3—CFFO—Ph3—F | 4 |
| 3-Ph—Ph3—CFFO—Ph3—F | 6 |
| Tni/° C. | 110.0 |
| Δn | 0.099 |
| Δε | 8.3 |
| γ1/mPa · s | 100 |
| η/mPa · s | 23 |

TABLE 22-continued

| Chemical structure | Ratio (%) |
|---|---|
| LC-18 | |
| 3-Cy-Cy-1d1 | 17 |
| 3-Cy-Cy-1d0FF | 27 |
| 0d1-Cy-Cy-Ph-1 | 10 |
| 0d3-Cy-Cy-Ph-1 | 1 |
| 2-Ph—Ph1—Ph-3 | 11 |
| 2-Ph—Ph1—Ph-5 | 13 |
| 5-Cy-Ph—Ph1—Ph-2 | 8 |
| 3-Ph—Ph3—CFFO—Ph3—F | 7 |
| 3-Cy-Cy-CFFO—Ph3—F | 6 |
| Tni/° C. | 90.0 |
| Δn | 0.126 |
| Δε | 3.6 |
| γ1/mPa · s | 52 |
| η/mPa · s | 12 |

The liquid crystal compositions LC-17 and LC-18 had good low-temperature solubility and showed substantially no change of initial VHR after being allowed to stand at a high temperature of 150° C. for 1 hour. Also, TN liquid crystal display devices were manufactured by using the liquid crystal compositions LC-17 and LC-18 and evaluated with respect to image sticking, dropping marks, and process adaptability. As a result, excellent results were obtained as shown below.

TABLE 23

| | LC-17 | LC-18 |
|---|---|---|
| Initial VHR (%) | 98.5 | 99.8 |
| VHR after 1 hour at 150° C. | 97.7 | 99.4 |
| Evaluation of image sticking | A | A |
| Evaluation of dropping marks | A | A |
| Evaluation of process adaptability | A | A |
| Evaluation of low-temperature solubility | A | A |

Example 18 and Example 19

Liquid crystal compositions LC-19 and LC-20 described below were prepared, and physical property values thereof were measured. The results are shown in a table below.

TABLE 24

| Chemical structure | Ratio (%) |
|---|---|
| LC-19 | |
| 3-Cy-Cy-1d0 | 35 |
| 3-Cy-Cy-1d1 | 15 |
| 1-Ph—Ph-3d1 | 11 |
| 3-Cy-Ph—Ph-2 | 4 |
| 3-Ph—Ph1—Ph-3 | 8 |
| 3-Cy-Ph—Ph1—F | 4 |
| 5-Cy-Ph—Ph1—F | 5 |
| 3-Cy-Cy-Ph1—Ph3—F | 8 |
| 3-Ph—Ph3—CFFO—Ph3—F | 6 |
| 3-Ph—Ph1—Ph3—CFFO—Ph3—F | 4 |
| Tni/° C. | 76.8 |
| Δn | 0.113 |
| Δε | 4.5 |
| γ1/mPa · s | 44 |
| η/mPa · s | 10 |
| LC-20 | |
| 3-Cy-Cy-1d0 | 37 |
| 3-Cy-Cy-1d1 | 12 |
| 0d1-Cy-Cy-Ph-1 | 4 |
| 0d3-Cy-Cy-Ph-1 | 9 |
| 2-Ph—Ph3—CFFO—Ph3—F | 7 |

TABLE 24-continued

| Chemical structure | Ratio (%) |
|---|---|
| 3-Ph—Ph3—CFFO—Ph3—F | 3 |
| 3-Cy-Cy-CFFO—Ph3—F | 2 |
| 5-Cy-Cy-CFFO—Ph3—F | 3 |
| 3-Ph—Ph1—Ph3—F | 9 |
| 2-Ph—Ph1—Ph3—F | 5 |
| 3-Cy-Cy-Ph1—Ph3—F | 9 |
| Tni/° C. | 75.5 |
| Δn | 0.100 |
| Δε | 7.0 |
| γ1/mPa·s | 49 |
| η/mPa·s | 11 |

The liquid crystal compositions LC-19 and LC-20 had good low-temperature solubility and showed substantially no change of initial VHR after being allowed to stand at a high temperature of 150° C. for 1 hour. Also, TN liquid crystal display devices were manufactured by using the liquid crystal compositions LC-19 and LC-20 and evaluated with respect to image sticking, dropping marks, and process adaptability. As a result, excellent results were obtained as shown below.

TABLE 25

|  | LC-19 | LC-20 |
|---|---|---|
| Initial VHR (%) | 99.5 | 98.9 |
| VHR after 1 hour at 150° C. | 99.0 | 98.1 |
| Evaluation of image sticking | A | A |
| Evaluation of dropping marks | A | A |
| Evaluation of process adaptability | A | A |
| Evaluation of low-temperature solubility | A | A |

Example 20 and Example 21

Liquid crystal compositions LC-21 and LC-22 described below were prepared, and physical property values thereof were measured. The results are shown in a table below.

TABLE 26

| Chemical structure | Ratio (%) |
|---|---|
| LC-21 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 0d1-Cy-Cy-Ph1—F | 8 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 3-Cy-Cy-Ph1—Ph3—F | 9 |
| 2-Ph—Ph3—CFFO—Ph3—F | 4 |
| 3-Ph—Ph3—CFFO—Ph3—F | 6 |
| Tni/° C. | 110.0 |
| Δn | 0.099 |
| Δε | 8.3 |
| γ1/mPa·s | 100 |
| η/mPa·s | 23 |
| LC-22 | |
| 3-Cy-Cy-1d0 | 22 |
| 3-Cy-Cy-1d1 | 6 |
| 2-Ph—Ph1—Ph-3 | 8 |
| 3-Cy-Cy-VO—Ph-Cy-3 | 4 |
| 3-Ph—Ph3—CFFO—Ph3—F | 15 |

TABLE 26-continued

| Chemical structure | Ratio (%) |
|---|---|
| 3-Cy-Cy-CFFO—Ph3—F | 7 |
| 5-Cy-Cy-CFFO—Ph3—F | 8 |
| 3-Ph—Ph1—Ph3—CFFO—Ph3—F | 7 |
| 2-Py—Ph—Ph3—CFFO—Ph3—F | 7 |
| 3-Py—Ph—Ph3—CFFO—Ph3—F | 8 |
| 3-Cy-Ph—Ph3—Ph1—OCFFF | 6 |
| 3-Ph—Ph—Ph1—Ph3—F | 2 |
| Tni/° C. | 98.3 |
| Δn | 0.134 |
| Δε | 18.5 |
| γ1/mPa·s | 176 |
| η/mPa·s | 30 |

The liquid crystal compositions LC-21 and LC-22 had good low-temperature solubility and showed slight allowable change of initial VHR after being allowed to stand at a high temperature of 150° C. for 1 hour. Also, TN liquid crystal display devices were manufactured by using the liquid crystal compositions LC-21 and LC-22 and evaluated with respect to image sticking, dropping marks, and process adaptability. As a result, excellent results were obtained as shown below.

TABLE 27

|  | LC-21 | LC-22 |
|---|---|---|
| Initial VHR (%) | 98.5 | 97.5 |
| VHR after 1 hour at 150° C. | 97.8 | 94.9 |
| Evaluation of image sticking | A | A |
| Evaluation of dropping marks | A | A |
| Evaluation of process adaptability | A | A |
| Evaluation of low-temperature solubility | A | A |

Example 22 and Example 23

Liquid crystal compositions LC-23 and LC-24 described below were prepared, and physical property values thereof were measured. The results are shown in a table below.

TABLE 28

| Chemical structure | Ratio (%) |
|---|---|
| LC-23 | |
| 3-Cy-Cy-1d0 | 11 |
| 3-Cy-Cy-1d1 | 4 |
| 0d1-Cy-Cy-Ph-1 | 3 |
| 0d3-Cy-Cy-Ph-1 | 10 |
| 3-Cy-Ph—Ph-Cy-3 | 4 |
| 3-Cy-Ph—Ph1-Cy-3 | 3 |
| 0d1-Cy-Cy-Ph1—F | 8 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 10 |
| 3-Cy-Cy-Ph1—Ph3—F | 8 |
| 2-Ph—Ph3—CFFO—Ph3—F | 6 |
| 3-Ph—Ph3—CFFO—Ph3—F | 4 |
| Tni/° C. | 101.0 |
| Δn | 0.092 |
| Δε | 9.3 |
| γ1/mPa·s | 90 |
| η/mPa·s | 21 |
| LC-24 | |
| 3-Cy-Cy-1d0 | 41 |
| 3-Cy-Cy-1d1 | 11 |
| 3-Cy-Ph—Ph-2 | 7 |
| 2-Ph—Ph1—Ph-3 | 4 |
| 2-Ph—Ph1—Ph-4 | 2 |

TABLE 28-continued

| Chemical structure | Ratio (%) |
| --- | --- |
| 2-Ph—Ph1—Ph-5 | 6 |
| 3-Cy-Ph—Ph-Cy-3 | 4 |
| 3-Ph—Ph3—CFFO—Ph3—F | 3 |
| 3-Ph—Ph1—Ph3—F | 9 |
| 3-Cy-Cy-Ph1—Ph3—F | 3 |
| 3-Cy-Ph—Cl | 3 |
| 2-Ph—Ph3—Ph3—F | 7 |
| Tni/° C. | 75.1 |
| $\Delta n$ | 0.115 |
| $\Delta\epsilon$ | 3.9 |
| $\gamma 1/mPa \cdot s$ | 39 |
| $\eta/mPa \cdot s$ | 11 |

The liquid crystal compositions LC-23 and LC-24 had good low-temperature solubility and showed substantially no change of initial VHR after being allowed to stand at a high temperature of 150° C. for 1 hour. Also, TN liquid crystal display devices were manufactured by using the liquid crystal compositions LC-23 and LC-24 and evaluated with respect to image sticking, dropping marks, and process adaptability. As a result, excellent results were obtained as shown below.

TABLE 29

| | LC-23 | LC-24 |
| --- | --- | --- |
| Initial VHR (%) | 98.6 | 99.6 |
| VHR after 1 hour at 150° C. | 97.9 | 99.3 |
| Evaluation of image sticking | A | A |
| Evaluation of dropping marks | A | A |
| Evaluation of process adaptability | A | A |
| Evaluation of low-temperature solubility | A | A |

Example 24 and Example 25

Liquid crystal compositions LC-25 and LC-26 described below were prepared, and physical property values thereof were measured. The results are shown in a table below.

TABLE 30

| Chemical structure | Ratio (%) |
| --- | --- |
| LC-25 | |
| 3-Cy-Cy-1d0 | 10 |
| 4-Cy-Cy-1d0 | 21 |
| 3-Cy-Cy-1d1 | 18 |
| 1-Ph—Ph-5 | 6 |
| 1-Ph—Ph-3d1 | 6 |
| 0d1-Cy-Cy-Ph-1 | 8 |
| 2-Ph—Ph1—Ph-3 | 8 |
| 2-Ph—Ph1—Ph-5 | 9 |
| 3-Ph—Ph3—CFFO—Ph3—F | 5 |
| 5-Ph—Ph1—Ph3—CFFO—Ph3—F | 5 |
| 3-Cy-Ph—Ph3—Ph1—OCFFF | 4 |
| Tni/° C. | 77.5 |
| $\Delta n$ | 0.126 |
| $\Delta\epsilon$ | 3.0 |
| $\gamma 1/mPa \cdot s$ | 47 |
| $\eta/mPa \cdot s$ | 13 |
| LC-26 | |
| 3-Cy-Cy-1d0 | 6 |
| 3-Cy-Cy-1d0FF | 28 |
| 2-Cy-Cy-1d1 | 8 |
| 3-Cy-Cy-1d1 | 8 |
| 0d1-Cy-Cy-Ph-1 | 5 |
| 0d3-Cy-Cy-Ph-1 | 6 |
| 2-Ph—Ph1—Ph-3 | 11 |
| 2-Ph—Ph1—Ph-5 | 13 |

TABLE 30-continued

| Chemical structure | Ratio (%) |
| --- | --- |
| 5-Cy-Ph—Ph1—Ph-2 | 2 |
| 3-Ph—Ph3—CFFO—Ph3—F | 7 |
| 3-Cy-Cy-CFFO—Ph3—F | 6 |
| Tni/° C. | 73.8 |
| $\Delta n$ | 0.112 |
| $\Delta\epsilon$ | 3.7 |
| $\gamma 1/mPa \cdot s$ | 43 |
| $\eta/mPa \cdot s$ | 10 |

The liquid crystal compositions LC-25 and LC-26 had good low-temperature solubility and showed substantially no change of initial VHR after being allowed to stand at a high temperature of 150° C. for 1 hour. Also, TN liquid crystal display devices were manufactured by using the liquid crystal compositions LC-25 and LC-26 and evaluated with respect to image sticking, dropping marks, and process adaptability. As a result, excellent results were obtained as shown below.

TABLE 31

| | LC-25 | LC-26 |
| --- | --- | --- |
| Initial VHR (%) | 99.7 | 99.6 |
| VHR after 1 hour at 150° C. | 99.3 | 99.1 |
| Evaluation of image sticking | A | A |
| Evaluation of dropping marks | A | A |
| Evaluation of process adaptability | A | A |
| Evaluation of low-temperature solubility | A | A |

Example 26 and Example 27

Liquid crystal compositions LC-27 and LC-28 described below were prepared, and physical property values thereof were measured. The results are shown in a table below.

TABLE 32

| Chemical structure | Ratio (%) |
| --- | --- |
| LC-27 | |
| 3-Cy-Cy-1d0 | 30 |
| 3-Cy-Cy-1d1 | 19 |
| 0d1-Cy-Cy-Cy-3 | 8 |
| 1-Ph—Ph-5 | 4 |
| 1-Ph—Ph-3d1 | 8 |
| 2-Ph—Ph1—Ph-3 | 6 |
| 2-Ph—Ph1—Ph-4 | 5 |
| 3-Ph—Ph3—CFFO—Ph3—F | 6 |
| 3-Ph—Ph1—Ph3—CFFO—Ph3—F | 10 |
| 3-Cy-Ph—Ph3—Ph1—OCFFF | 4 |
| Tni/° C. | 75.1 |
| $\Delta n$ | 0.122 |
| $\Delta\epsilon$ | 4.7 |
| $\gamma 1/mPa \cdot s$ | 45 |
| $\eta/mPa \cdot s$ | 12 |
| LC-28 | |
| 3-Cy-Cy-1d0 | 40 |
| 3-Cy-Cy-1d1 | 14 |
| 3-Ph—Ph3—CFFO—Ph3—F | 6 |
| 2-Ph—Ph1—Ph-3 | 7 |
| 2-Ph—Ph1—Ph-5 | 7 |
| 0d1-Cy-Cy-Ph-1 | 5 |
| 0d3-Cy-Cy-Ph-1 | 4 |
| 2-Cy-Ph—Ph—F | 2 |
| 3-Cy-Ph—Ph—F | 6 |
| 2-Cy-Cy-Ph—Ph3—F | 7 |
| 3-Cy-Cy-Ph—Ph3—F | 2 |
| Tni/° C. | 79.2 |
| $\Delta n$ | 0.098 |

TABLE 32-continued

| Chemical structure | Ratio (%) |
|---|---|
| Δε | 3.7 |
| γ1/mPa·s | 40 |
| η/mPa·s | 11 |

The liquid crystal compositions LC-27 and LC-28 had good low-temperature solubility and showed substantially no change of initial VHR after being allowed to stand at a high temperature of 150° C. for 1 hour. Also, TN liquid crystal display devices were manufactured by using the liquid crystal compositions LC-27 and LC-28 and evaluated with respect to image sticking, dropping marks, and process adaptability. As a result, excellent results were obtained as shown below.

TABLE 33

|  | LC-27 | LC-28 |
|---|---|---|
| Initial VHR (%) | 99.5 | 99.8 |
| VHR after 1 hour at 150° C. | 99.2 | 99.4 |
| Evaluation of image sticking | A | A |
| Evaluation of dropping marks | A | A |
| Evaluation of process adaptability | A | A |
| Evaluation of low-temperature solubility | A | A |

Example 28 and Example 29

Liquid crystal compositions LC-29 and LC-30 described below were prepared, and physical property values thereof were measured. The results are shown in a table below.

TABLE 34

| Chemical structure | Ratio (%) |
|---|---|
| LC-29 | |
| 3-Cy-Cy-1d0 | 35 |
| 3-Cy-Cy-1d1 | 15 |
| 1-Ph—Ph-3d1 | 11 |
| 3-Cy-Ph—Ph-2 | 4 |
| 3-Ph—Ph1—Ph-5 | 8 |
| 3-Cy-Ph—Ph1—F | 4 |
| 5-Cy-Ph—Ph1—F | 5 |
| 3-Cy-Cy-Ph1—Ph3—F | 8 |
| 3-Ph—Ph3—CFFO—Ph3—F | 6 |
| 3-Ph—Ph1—Ph3—CFFO—Ph3—F | 4 |
| Tni/° C. | 78.2 |
| Δn | 0.113 |
| Δε | 4.5 |
| γ1/mPa·s | 44 |
| η/mPa·s | 10 |
| LC-30 | |
| 3-Cy-Cy-1d0 | 41 |
| 3-Cy-Cy-1d1 | 11 |
| 3-Cy-Ph—Ph-2 | 7 |
| 2-Ph—Ph1—Ph-3 | 4 |
| 2-Ph—Ph1—Ph-4 | 2 |
| 2-Ph—Ph1—Ph-5 | 6 |
| 3-Cy-Ph—Ph-Cy-3 | 4 |
| 3-Ph—Ph3—CFFO—Ph3—F | 3 |
| 3-Ph—Ph1—Ph3—F | 9 |
| 3-Cy-Cy-Ph1—Ph3—F | 3 |
| 3-Cy-Ph—Cl | 3 |
| 3-Ph—Ph3—Ph3—F | 7 |
| Tni/° C. | 79 |
| Δn | 0.115 |
| Δε | 3.9 |
| γ1/mPa·s | 39 |
| η/mPa·s | 11 |

The liquid crystal compositions LC-29 and LC-30 had good low-temperature solubility and showed substantially no change of initial VHR after being allowed to stand at a high temperature of 150° C. for 1 hour. Also, TN liquid crystal display devices were manufactured by using the liquid crystal compositions LC-29 and LC-30 and evaluated with respect to image sticking, dropping marks, and process adaptability. As a result, excellent results were obtained as shown below.

TABLE 35

|  | LC-29 | LC-30 |
|---|---|---|
| Initial VHR (%) | 99.3 | 99.6 |
| VHR after 1 hour at 150° C. | 98.9 | 99.1 |
| Evaluation of image sticking | A | A |
| Evaluation of dropping marks | A | A |
| Evaluation of process adaptability | A | A |
| Evaluation of low-temperature solubility | A | A |

Example 30 and Example 31

Liquid crystal compositions LC-31 and LC-32 described below were prepared, and physical property values thereof were measured. The results are shown in a table below.

TABLE 36

| Chemical structure | Ratio (%) |
|---|---|
| LC-31 | |
| 3-Cy-Cy-1d0 | 47 |
| 3-Cy-Cy-1d1 | 9 |
| 3-Ph—Ph1—Ph3—F | 13 |
| 3-Ph—Ph3—CFFO—Ph3—F | 2 |
| 3-Cy-Ph—Ph-2 | 7 |
| 2-Ph—Ph1—Ph-3 | 4 |
| 2-Ph—Ph1—Ph-5 | 7 |
| 3-Cy-Cy-Ph1—Ph3—F | 2 |
| 3-Cy-Ph—Ph-Cy-3 | 2 |
| 3-Cy-Ph—Ph3—Ph1—OCFFF | 7 |
| Tni/° C. | 81.2 |
| Δn | 0.122 |
| Δε | 4.7 |
| γ1/mPa·s | 50 |
| η/mPa·s | 12 |
| LC-32 | |
| 3-Cy-Cy-1d0 | 47 |
| 3-Cy-Cy-1d1 | 9 |
| 2-Ph—Ph1—Ph3—F | 4 |
| 3-Ph—Ph1—Ph3—F | 9 |
| 3-Ph—Ph3—CFFO—Ph3—F | 2 |
| 3-Cy-Ph—Ph-2 | 7 |
| 2-Ph—Ph1—Ph-3 | 4 |
| 2-Ph—Ph1—Ph-5 | 7 |
| 3-Cy-Cy-Ph1—Ph3—F | 2 |
| 3-Cy-Ph—Ph-Cy-3 | 2 |
| 3-Cy-Ph—Ph3—Ph1—OCFFF | 7 |
| Tni/° C. | 80.5 |
| Δn | 0.121 |
| Δε | 4.8 |
| γ1/mPa·s | 51 |
| η/mPa·s | 12 |

The liquid crystal compositions LC-31 and LC-32 had good low-temperature solubility and showed substantially no change of initial VHR after being allowed to stand at a high temperature of 150° C. for 1 hour. Also, TN liquid crystal display devices were manufactured by using the liquid crystal compositions LC-31 and LC-32 and evaluated with respect to image sticking, dropping marks, and process adaptability. As a result, excellent results were obtained as shown below.

TABLE 37

|  | LC-31 | LC-32 |
|---|---|---|
| Initial VHR (%) | 99.5 | 99.6 |
| VHR after 1 hour at 150° C. | 99.3 | 99.3 |
| Evaluation of image sticking | A | A |
| Evaluation of dropping marks | A | A |
| Evaluation of process adaptability | A | A |
| Evaluation of low-temperature solubility | A | A |

Example 32 and Example 33

Liquid crystal compositions LC-33 and LC-34 described below were prepared, and physical property values thereof were measured. The results are shown in a table below.

TABLE 38

| Chemical structure | Ratio (%) |
|---|---|
| LC-33 | |
| 3-Cy-Cy-1d0 | 22 |
| 3-Cy-Cy-1d1 | 6 |
| 2-Ph—Ph1—Ph-3 | 8 |
| 3-Cy-Cy-VO—Ph-Cy-3 | 4 |
| 3-Ph—Ph3—CFFO—Ph3—F | 15 |
| 3-Cy-Cy-CFFO—Ph3—F | 7 |
| 5-Cy-Cy-CFFO—Ph3—F | 8 |
| 3-Ph—Ph1—Ph3—CFFO—Ph3—F | 7 |
| 2-Py—Ph—Ph3—CFFO—Ph3—F | 5 |
| 3-Py—Ph—Ph3—CFFO—Ph3—F | 10 |
| 3-Cy-Ph—Ph3—Ph1—OCFFF | 6 |
| 3-Ph—Ph—Ph1—Ph3—F | 2 |
| Tni/° C. | 98.3 |
| $\Delta n$ | 0.134 |
| $\Delta \epsilon$ | 18.5 |
| $\gamma 1$/mPa · s | 176 |
| $\eta$/mPa · s | 30 |
| LC-34 | |
| 3-Cy-Cy-1d1 | 5 |
| 5-Cy-Cy-1d0 | 18 |
| 5-Cy-Ph—O2 | 8 |
| 0d1-Cy-Cy-Ph-1 | 14 |
| 3-Cy-Cy-VO—Ph-Cy-3 | 3 |
| 3-Cy-Cy-VO—Ph-Cy-4 | 3 |
| 3-Cy-Cy-VO—Ph-Cy-5 | 3 |
| 2-Cy-Ph—Ph3—F | 5 |
| 2-Cy-Ph—Ph3—F | 5 |
| 3-Cy-Cy-CFFO—Ph3—F | 17 |
| 2-Cy-Cy-CFFO—Ph3—F | 6 |
| 3-Ph—Ph3—CFFO—Ph3—F | 7 |
| 2-Ph—Ph3—CFFO—Ph3—F | 6 |
| Tni/° C. | 98.6 |
| $\Delta n$ | 0.095 |
| $\Delta \epsilon$ | 6.0 |
| $\gamma 1$/mPa · s | 96 |
| $\eta$/mPa · s | 20 |

The liquid crystal compositions LC-33 and LC-34 had good low-temperature solubility and showed slight change of initial VHR within an allowable range after being allowed to stand at a high temperature of 150° C. for 1 hour. Also, TN liquid crystal display devices were manufactured by using the liquid crystal compositions LC-33 and LC-34 and evaluated with respect to image sticking, dropping marks, and process adaptability. As a result, excellent results were obtained as shown below.

TABLE 39

|  | LC-33 | LC-34 |
|---|---|---|
| Initial VHR (%) | 97.5 | 99.2 |
| VHR after 1 hour at 150° C. | 94.3 | 98.5 |
| Evaluation of image sticking | A | A |
| Evaluation of dropping marks | A | A |
| Evaluation of process adaptability | A | A |
| Evaluation of low-temperature solubility | A | A |

Example 34

Liquid crystal composition LC-35 described below was prepared, and physical property values thereof were measured. The results are shown in a table below.

TABLE 40

| Chemical structure | Ratio (%) |
|---|---|
| LC-35 | |
| 3-Cy-Cy-1d1 | 20 |
| 0d1-Cy-Cy-Ph-1 | 8 |
| 0d3-Cy-Cy-Ph-1 | 9 |
| 2-Ph—Ph1—Ph-3 | 5 |
| 2-Ph—Ph1—Ph-4 | 3 |
| 3-Ph—Ph1—Ph-5 | 7 |
| 3-Ph—Ph3—CFFO—Ph3—F | 12 |
| 2-Cy-Cy-Ph—F | 6 |
| 3-Cy-Cy-Ph—F | 19 |
| 5-Cy-Ph—Ph—F | 9 |
| 2-Cy-Ph—Ph3—F | 2 |
| Tni/° C. | 75.9 |
| $\Delta n$ | 0.130 |
| $\Delta \epsilon$ | 8.8 |
| $\gamma 1$/mPa · s | 63 |
| $\eta$/mPa · s | 12 |

The liquid crystal composition LC-35 had good low-temperature solubility and showed slight change of initial VHR within an allowable range after being allowed to stand at a high temperature of 150° C. for 1 hour. Also, a TN liquid crystal display device was manufactured by using the liquid crystal composition LC-35 and evaluated with respect to image sticking, dropping marks, and process adaptability. As a result, excellent results were obtained as shown below.

TABLE 41

|  | LC-35 |
|---|---|
| Initial VHR (%) | 98.7 |
| VHR after 1 hour at 150° C. | 97.9 |
| Evaluation of image sticking | A |
| Evaluation of dropping marks | A |
| Evaluation of process adaptability | A |
| Evaluation of low-temperature solubility | A |

Example 35

A polymerizable liquid crystal composition CLC-1 was prepared by adding and uniformly dissolving 0.3% of a polymerizable compound to and in 99.7% of the nematic liquid crystal composition LC-1 described in Example 1, the polymerizable compound being represented by formula (V-2).

[Chem. 51]

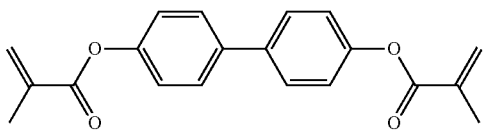

The physical properties of CLC-1 were substantially the same as those of the nematic liquid crystal composition described in Example 1. CLC-1 was injected, by a vacuum injection method, into a cell provided with ITO which had a cell gap of 3.5 μm and was coated with a polyimide alignment film for inducing homogeneous alignment. Then, the liquid crystal cell was irradiated with ultraviolet light using a high-pressure mercury lamp through a filter provided to cut off ultraviolet light of 320 nm or less while a rectangular wave at a frequency of 1 kHz was applied to the cell. The polymerizable compound in the polymerizable liquid crystal composition was polymerized by ultraviolet irradiation for 600 seconds so that the irradiation intensity on a surface of the cell was 10 mW/cm², thereby producing a horizontal-alignment liquid crystal display device. It could be confirmed that an alignment regulating force is produced on the liquid crystal compound by polymerizing the polymerizable compound.

Example 36

Manufacture of Liquid Crystal Display Device for Active Matrix Driving (Formation of Front Plane)
(Formation of Black Matrix)

A composition for forming a black matrix having a composition described below was applied, by using a die coater, to a borosilicate glass substrate for a liquid crystal display device (OA-10 manufactured by Nippon Electric Glass Co., Ltd.) so that a wet thickness was 10 μm, dried, and then pre-baked at a temperature of 90° C. for 2 minutes to form a black matrix layer having a thickness of 2 μm.

(Coating Composition for Forming Black Matrix)
 Benzyl methacrylate/methacrylic acid copolymer (molar ratio=73/27) 300 parts
 Dipentaerythritol hexaacrylate 160 parts
 Carbon black dispersion 300 parts
 Photopolymerization initiator (2-benzyl-2-dimethylamino-1-(4-morpholinophenyl)butanone-1) 5 parts
 Propylene glycol monomethyl ether acetate 1200 parts
 "Parts" is on a mass basis.

Then, the glass substrate provided with the black matrix layer formed as described above was introduced in an exposure apparatus provided with a device which transferred the substrate from the upstream side to the downstream side, and transferred to an exposure portion.

The exposure apparatus was adjusted so that the body temperature was 23° C.±0.1° C. and relative humidity was 60%±1%.

The glass substrate provided with the black matrix layer was fixed to an exposure stand by attraction, and then automatically adjusted so that the gap between the coating film surface of the glass substrate and a photomask pattern was 100 μm. Also, an exposure position of the glass substrate was automatically adjusted by automatically detecting the distance from an end surface of the glass substrate so that the distance from the glass substrate to the photomask pattern position was constant, followed by exposure. Exposure was performed using a high-pressure mercury lamp as a light source for 20 seconds with an exposure area of 200 mm×200 mm, I line (wavelength: 365 nm), an illuminance of 15 mW/cm², and an exposure amount of 300 mJ/cm².

Development was performed by using a development apparatus installed downstream of the exposure apparatus. The glass substrate after exposure was transferred at a constant velocity of 400 mm/min to form a substrate (1) with a black matrix layer in which the black matrix was laminated in a predetermined pattern.

Dimensional changes of an alignment mark made of the same material as the black matrix were measured with a dimension measuring machine (NEXIV VMR-6555 manufactured by Nikon Corporation) in the transfer direction and the direction perpendicular to the transfer direction under the conditions of a temperature of 23° C.±0.1° C. and a relative humidity of 60%±1%. As a result, the dimensions of the pattern actually formed on the glass substrate were 99.998 mm in the transfer direction and 100.001 mm in the perpendicular direction relative to the photomask dimensions of 100.000 mm in the transfer direction and 100.00 mm in the perpendicular direction.

Then, the black matrix was thermally cured by post-baking at 220° C. for 30 minutes in a baking furnace. Measurement of the resultant black matrix under the same conditions as the above (temperature: 23° C.±0.1° C., relative humidity: 60%±1%) indicated that the pattern formed on the substrate (1) had a dimension of 99.998 mm in the transfer direction and a dimension of 100.001 mm in the perpendicular direction.

(Formation of RGB Colored Layers)

A composition for forming a colored pattern having a composition described below was applied by using a die coater to the substrate (1) with the black matrix layer so that a wet thickness was 10 μm, dried, and then pre-baked under the condition of 90° C. for 2 minutes to produce the substrate (1) of 2 μm in thickness with the black matrix layer and the composition for forming a colored pattern.

Although a composition for forming a red colored pattern is described below, a composition for forming a green colored pattern and a composition for forming a blue colored pattern can be prepared by changing a red pigment to a desired green pigment and blue pigment, respectively. Each of the red, green, and blue color pigments may contain a resin composition for improving coloring and luminance. In this case, a block copolymer with methacrylic acid having a primary, secondary, or tertiary amino group is often used as the resin composition for this purpose, and an example thereof is "BYK6919" manufactured by BYK Inc.

(Composition for Forming Red Colored Pattern)
 Benzyl methacrylate/methacrylic acid copolymer (molar ratio=73/27) 50 parts
 Trimethylolpropane triacrylate 40 parts
 Red pigment (C. I. Pigment Red 254) 90 parts
 Photopolymerization initiator (2-methyl-1-[4-(methylthio)phenyl]-2-morpholinopropanone-1) 1.5 parts
 Propylene glycol monomethyl ether acetate 600 parts
 "Parts" is on a mass basis.

(Green Colored Pattern)

A composition was produced by the same method as for the composition for forming a red colored pattern except that a green pigment (for example, C. I. Pigment Green 58) was used in place of the red pigment of the composition for forming a red colored pattern.

(Blue Colored Pattern)

A composition was produced by the same method as for the composition for forming a red colored pattern except that a blue pigment (for example, C. I. Pigment Blue 15.6) was used in place of the red pigment of the composition for forming a red colored pattern.

Then, the substrate (1) provided with the black matrix layer and the composition for forming a colored pattern formed as described above was introduced in the exposure apparatus including a transfer device provided in the direction from the upstream side to the downstream side, and transferred to an exposure portion.

The body temperature of the exposure apparatus was adjusted 23° C.±0.1° C., and the relative humidity was adjusted to 60%±1%.

The substrate (1) provided with the black matrix layer and the composition for forming a colored pattern was fixed to an exposure stand by attraction, and then automatically adjusted so that the gap between the coating film surface of the substrate (1) provided with the black matrix layer and the composition for forming a colored pattern and a photomask pattern was 100 μm. Also, an exposure position of the substrate (1) provided with the black matrix layer and the composition for forming a colored pattern was automatically adjusted by automatically detecting the distance from an end surface of the substrate (1) provided with the black matrix layer and the composition for forming a colored pattern so that the distance from the substrate (1) provided with the black matrix layer and the composition for forming a colored pattern to the photomask pattern position was constant. Then, the substrate (1) was aligned with a RED photomask using an alignment mark formed at the same time as formation of the black matrix, and then exposure was performed. The exposure was performed using a high-pressure mercury lamp as a light source for 20 seconds with an exposure area of 200 mm×200 mm, I line (wavelength: 365 nm), an illuminance of 15 mW/cm$^2$, and an exposure amount of 100 mJ/cm$^2$. Development was performed by using a development apparatus installed downstream of the exposure apparatus. The substrate (1) provided with the black matrix layer and the composition for forming a colored pattern after exposure was transferred at a constant velocity of 400 mm/min to form a substrate (1) with a RED colored layer deposited at a predetermined position in an aperture of the black matrix formed on the glass substrate. Then, the RED colored layer was thermally cured by post-baking at 220° C. for 30 minutes in a baking furnace. The Green and Blue colored layers were formed by repeating the method for RED, producing a color filter in which the black matrix and RGB colored layers were formed on the substrate (1). After post-baking of the BLUE colored layer, the black matrix was measured under the same conditions as the above (temperature: 23° C.±0.1° C., relative humidity: 60%±1%). As a result, the pattern formed on the glass substrate had a dimension of 99.999 mm in the transfer direction and a dimension of 100.002 mm in the perpendicular direction. In addition, a dimensional change of the black matrix in the manufacturing process from development of the first layer (black matrix layer) to post-baking of the fourth layer (BLUE layer) was 10 ppm, which resulted in the formation of the color filter on the glass substrate with no pixel deviation, a 4-inch size, and a resolution of 200 ppi (BM line width 7 μm, pitch 42 μm).

(Formation of ITO Electrode Layer)

Then, the color filter was introduced in a sputtering apparatus in which ITO (indium tin oxide) was deposited to a thickness of 150 nm on the black matrix and the RGB colored layers by reactive sputtering based on DC sputtering using ITO as a target and oxygen as reactive gas, thereby forming an ITO electrode layer. The thus-formed ITO electrode had a sheet resistance of 45 Ω/square.

(Formation of Columnar Spacer)
(Preparation of Dry Film)

With respect to a dry film for forming a columnar spacer, a composition for forming a columnar spacer, the composition being composed of a negative photosensitive resin, was applied by using a die coater to a PET base film having a thickness of 25 μm so that a wet thickness was 20 μm, dried, and then pre-baked under a condition of 90° C. for 2 minutes to forma a layer having a thickness of 4.5 μm. Then, a PET cover film having a thickness of 25 μm was laminated on the base film to form a dry film for forming a columnar spacer.
(Formation of Laminated Substrate)

The dry film for forming a spacer pattern, from which the cover film was previously removed, was laminated on the substrate (1) on which the black matrix, the RGB colored layers, and the ITO electrode layer had been formed, so that the composition for forming a columnar spacer faced the ITO electrode layer, and the composition layer for forming a columnar spacer was continuously transferred under the conditions of a roller pressure of 5 kg/cm$^2$, a roller surface temperature of 120° C., and a speed of 800 mm/min. In this case, the base film remaining attached to the composition for forming a columnar spacer without being separated was introduced into a next exposure process.
(Exposure Process)

The resultant laminated substrate was introduced in the exposure apparatus including a transfer device provided in the direction from the upstream side to the downstream side and transferred to an exposure portion.

The body temperature of the exposure apparatus was adjusted to 23° C.±0.1° C., and the relative humidity was adjusted to 60%±1%.

The laminated substrate was fixed to an exposure stand by attraction, and then automatically adjusted so that the gap between the base film of the laminated substrate and a photomask pattern was 30 μm. The photomask pattern used was designed so that a spacer pattern was formed on the black matrix.

Also, a pattern exposure position of the laminated substrate was automatically adjusted by automatically detecting the distance from an end surface of the laminated substrate so that the distance from the laminated substrate to the photomask pattern position was constant. Then, the substrate was aligned with a columnar spacer photomask using an alignment mark formed at the same time as formation of the black matrix, and then exposure was performed. The exposure was performed using a high-pressure mercury lamp as a light source for 20 seconds with an exposure area of 200 mm×200 mm, I line (wavelength: 365 nm), an illuminance of 15 mW/cm$^2$, and an exposure amount of 300 mJ/cm$^2$.
(Development and Post Baking)

Development was performed by using a development apparatus installed downstream of the exposure apparatus. The laminated substrate after exposure was transferred in the development apparatus at a constant velocity of 400 mm/min while the base film was separated from the substrate. This transfer produced a color filter in which a spacer pattern was formed at a predetermined position in a lattice pattern of the black matrix of the substrate (1) on which the black matrix, the RGB colored layers, and the ITO electrode layer had been formed. Then, a columnar spacer was thermally cured by post-baking at 220° C. for 30 minutes in a baking furnace. As a result, the columnar spacer was formed, by using the spacer pattern, on the substrate (1) on which the black matrix, the RGB colored layers, and the ITO electrode layer had been formed, thereby producing the front plane.

(Formation of Backplane)
(Formation of TFT Electrode Layer)

A glass plate for a liquid crystal display device (OA-10 manufactured by Nippon Electric Glass Co., Ltd.) was used as a transparent substrate, and a TFT electrode layer was formed on the transparent substrate according to a method described in Japanese Unexamined Patent Application Publication No. 2004-140381.

That is, an amorphous Si layer was formed to a thickness of 100 nm on the glass substrate, and then a Si oxide layer (SiOx) was formed by a vacuum deposition method. Then, a TFT layer and a pixel electrode were formed on the Si oxide layer by a photolithographic method and an etching method, thereby producing a glass substrate with a TFT array serving as the back plane.

(Manufacture of Liquid Crystal Display Device)
(Formation of Alignment Film)

A liquid crystal alignment film was formed on each of the front plane and the back plane produced as described above. After the two substrates were washed with pure water, a liquid crystal alignment agent containing polyimide was applied to each of the substrates by using a printer (flexographic printer) for applying a liquid crystal alignment film, and then dried for 20 minutes in an oven of 180° C. to form a coating film having a dry average thickness of 600 Å on each of the surface of the front plane on which ITO had been formed and the surface of the back plane on which the TFT electrode layer had been formed. Each of the resultant coating films was subjected to rubbing with a rubbing apparatus having a roll wound with a rayon cloth at a roll rotational speed of 400 rpm, a stage moving speed of 30 mm/second, and a pile penetration length of 0.4 mm, washed with water, and then dried on an oven of 120° C. for 10 minutes. Then, a sealing agent was applied by using a dispenser to draw a closed loop on a sealing agent application portion of the front plane.

A light-heat curable resin composition containing a bisphenol A-type methacrylic acid-modified epoxy resin was used as the sealing agent, and the sealing agent was mixed with a spherical spacer having substantially the same size as the columnar spacer formed as described above in an amount of 0.5% by mass relative to the resin component. The amount of the sealing agent applied was adjusted so that the liquid crystal display device had a seal width of 0.7 mm. Then, the liquid crystal composition (LC-13) described in Example 11 was dropped at a predetermined position inside the sealing agent closed loop by using a constant-volume measuring pump-type dispenser in such a manner that 24.7 pL each of the composition was dropped 90 times for one front plane (total 2230 pL).

After the liquid crystal was dropped, the front plane and the back plane were attached to an electrostatic chuck. The front plane and the back plane were disposed to face each other, and the back plane was slowly moved downward and stopped at a distance of 300 μm from the front plane. In this state, the pressure in a vacuum chamber was reduced to 100 Pa. The laminating position between the front plane and the back plane was adjusted by using an alignment mark previously formed. After the completion of alignment, the front plane and the back plane were put closer to each other, and the both substrates were maintained at a height where the sealing agent was in contact with the TFT electrode layer. In this state, inert gas was introduced into the vacuum chamber to return the inside of the system to atmospheric pressure. The front plane and the back plane were compressed by the atmospheric pressure to form a cell gap corresponding to the height of the columnar spacer. Then, the sealing agent applied portion was irradiated with ultraviolet light (365 nm, 30 kJ/m²) to cure the sealing agent, thereby fixing together the two substrates. In this state, the substrates holding the liquid crystal composition therebetween was transferred to a heating device, maintained at a surface temperature of 120° C. for 1 hour, and then air-cooled to produce a liquid crystal display device for active matrix driving.

The invention claimed is:

1. A liquid crystal composition having positive dielectric anisotropy, the composition comprising a component (A) which is a dielectrically positive component and a dielectrically neutral component (B) having a dielectric anisotropy of more than −2 and less than +2, the component (A) containing a dielectrically positive compound represented by (Formula-1) and at least one dielectrically positive compound selected from the group consisting of compounds represented by (Formula-5.1), (Formula-13.3), (Formula-17.2), and (Formula-17.4),

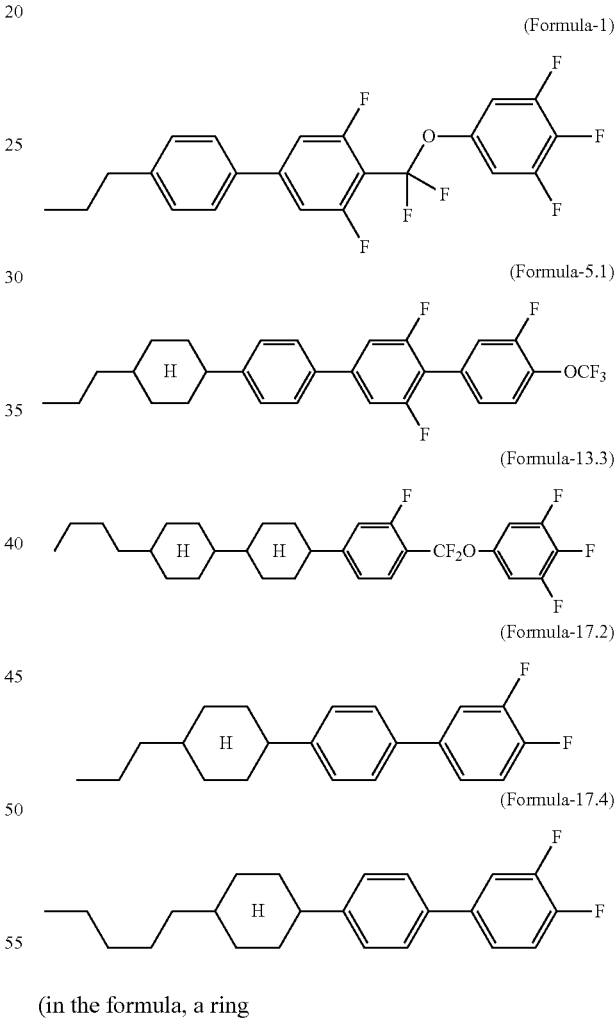

(in the formula, a ring

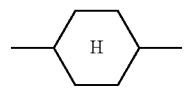

represents a 1,4-transcyclohexylene group) and the component (B) containing a dielectrically neutral compound represented by (Formula-2)

(Formula-2)

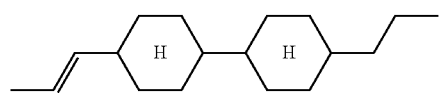

(in the formula, a ring

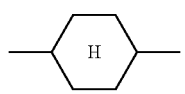

represents a 1,4-transcyclohexylene group).

2. The liquid crystal composition according to claim 1, wherein the dielectrically neutral component (B) further contains at least one dielectrically neutral compound selected from the group consisting of compounds represented by (Formula-7.7), (Formula-15.1), (Formula-16.1), (Formula-16.2), and (Formula-16.3), (Formula-7.7)

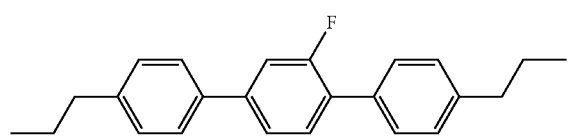

(Formula-15.1)

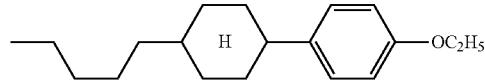

(Formula-16.1)

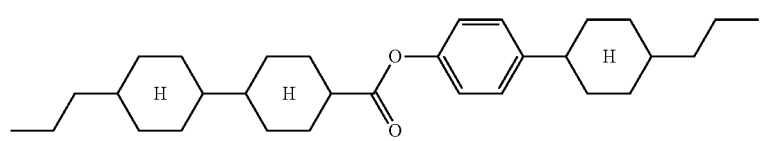

(Formula-16.2)

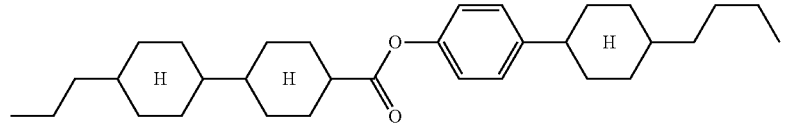

(Formula-16.3)

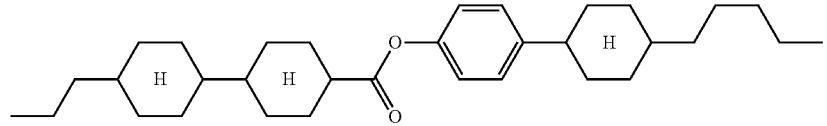

(in the formula, a ring

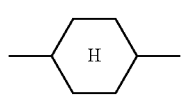

represents a 1,4-transcyclohexylene group).

3. The liquid crystal composition according to claim 1, wherein the dielectrically neutral component (B) further contains at least one compound represented by (Formula-3.1) or (Formula-3.2), (Formula-3.1)

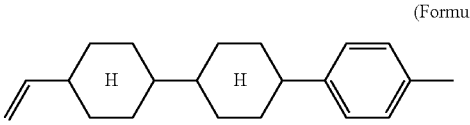

(Formula-3.2)

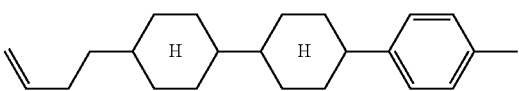

(in the formula, a ring

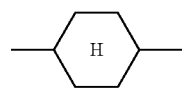

represents a 1,4-transcyclohexylene group).

4. The liquid crystal composition according to claim 1, wherein the dielectrically neutral component (B) further contains at least one compound selected from the group consisting of compounds represented by (Formula-4.1) to (Formula-4.8), (Formula-4.1)

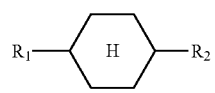

-continued (Formula-4.2)
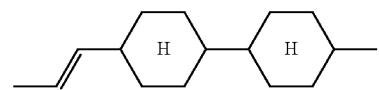

(Formula-4.3)
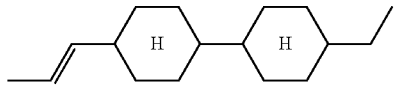

(Formula-4.4)
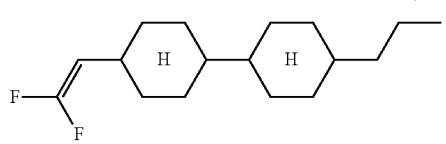

(Formula-4.5)
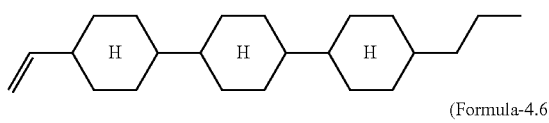

(Formula-4.6)
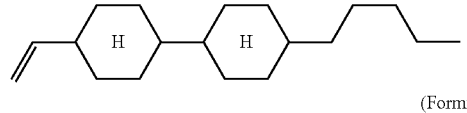

(Formula-4.7)
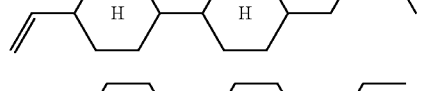

(Formula-4.8)
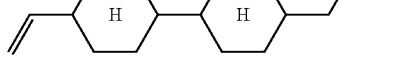

(in the formulae, R1 and R2 each independently represent a linear alkyl group or linear alkenyl group having 1 to 10 carbon atoms, (in the formulae, a ring

represents a 1,4-transcyclohexylene group).

5. The liquid crystal composition according to claim 1, wherein the dielectrically positive component (A) further contains at least one compound selected from the group consisting of compounds represented by (Formula-5.3), (Formula-5.3)
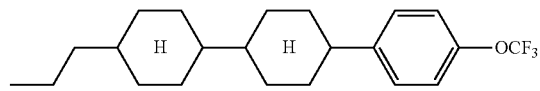

(in the formulae, a ring

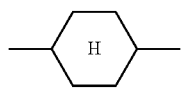

represents a 1,4-transcyclohexylene group).

6. The liquid crystal composition according to claim 1, wherein the dielectrically positive component (A) further contains at least one compound selected from the group consisting of compounds represented by (Formula-6.1) to (Formula-6.7), (Formula-6.1)
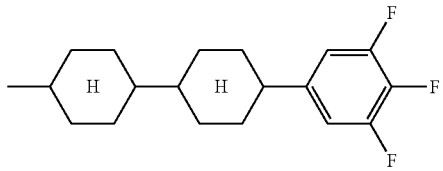

(Formula-6.2)
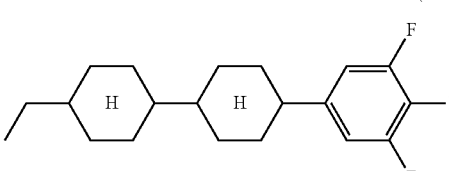

(Formula-6.3)
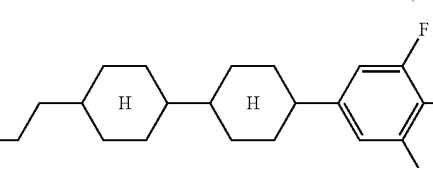

(Formula-6.4)
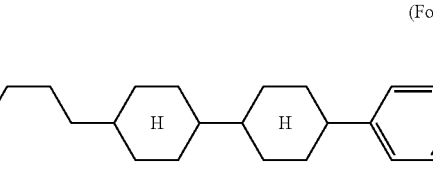

(Formula-6.5)
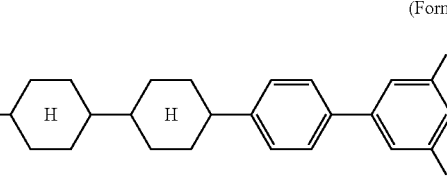

(Formula-6.6)
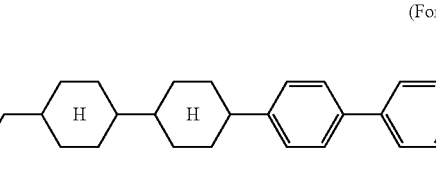

(Formula-6.7)
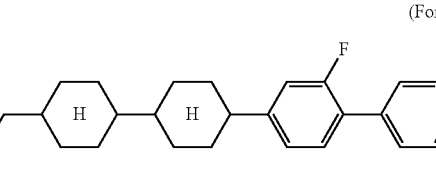

(in the formulae, a ring

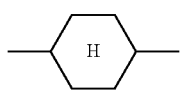

represents a 1,4-transcyclohexylene group).

7. The liquid crystal composition according to claim 1, wherein the dielectrically neutral component (B) further contains at least one compound selected from the group consisting of compounds represented by (Formula-7.1) to (Formula-7.6), (Formula-7.8), and (Formula-7.9).

(Formula-7.1)

(Formula-7.2)

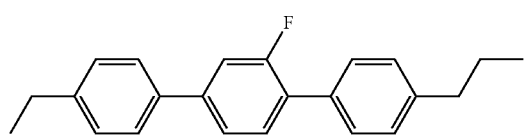

(Formula-7.3)

(Formula-7.4)

(Formula-7.5)

(Formula-7.6)

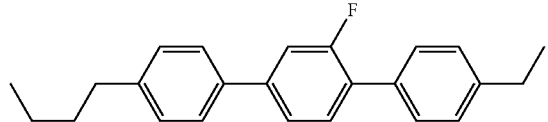

(Formula-7.8)

(Formula-7.9)

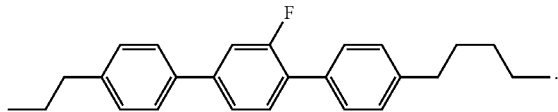

8. The liquid crystal composition according to claim 1, wherein the dielectrically neutral component (B) further contains a compound represented by (Formula-8), (Formula-8)

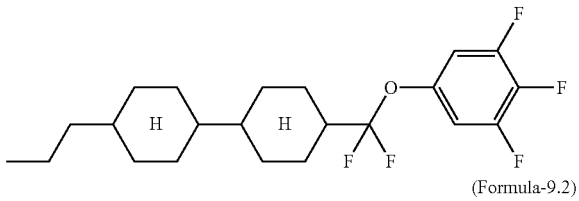

(in the formula, a ring

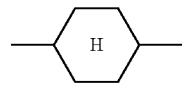

represents a 1,4-transcyclohexylene group).

9. The liquid crystal composition according to claim 1, wherein the dielectrically positive component (A) further contains at least one compound represented by (Formula-9.1) to (Formula-9.3), (Formula-9.1)

(Formula-9.2)

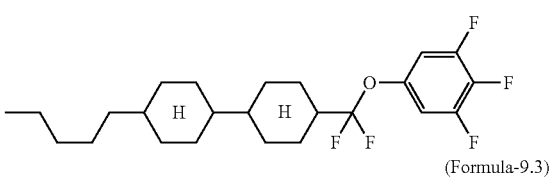

(Formula-9.3)

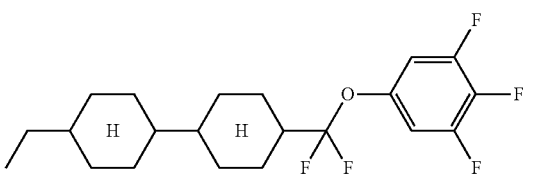

(in the formulae, a ring

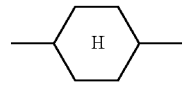

represents a 1,4-transcyclohexylene group).

10. The liquid crystal composition according to claim 1, wherein the dielectrically positive component (A) further contains at least one compound selected from the group consisting of compounds represented by (Formula-10.1) to (Formula-10.4).

(Formula-10.1)

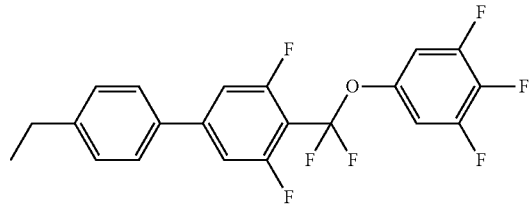

(Formula-10.2)

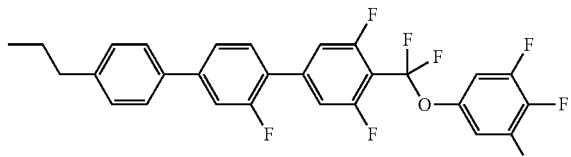

Formula-10.3)

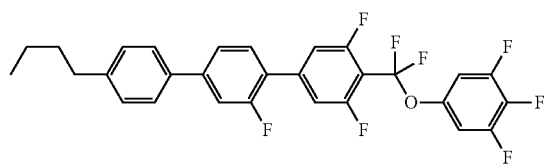

(Formula-10.4)

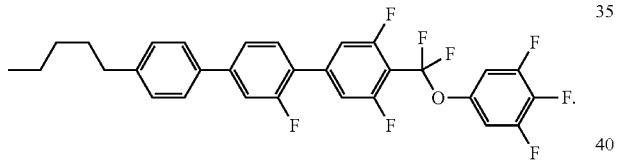

11. The liquid crystal composition according to claim 1, wherein the dielectrically neutral component (B) further contains at least one compound selected from the group consisting of compounds represented by (Formula-11.1) to (Formula-11.3), (Formula-11.1)

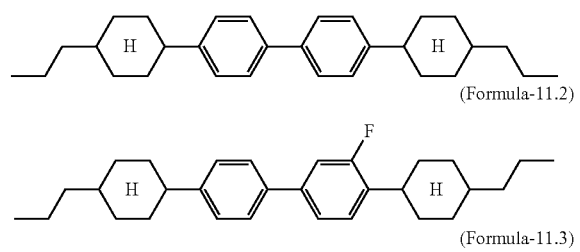

(Formula-11.2)

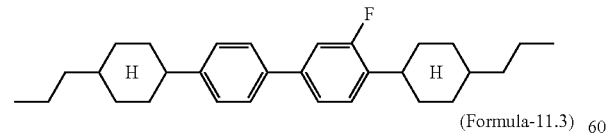

(Formula-11.3)

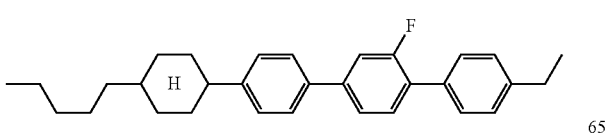

(in the formulae, a ring

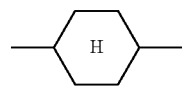

represents a 1,4-transcyclohexylene group).

12. The liquid crystal composition according to claim 1, wherein the dielectrically positive component (A) further contains at least one compound selected from the group consisting of compounds represented by (Formula-12.1) to (Formula-12.3) and (Formula-12.5).

(Formula-12.1)

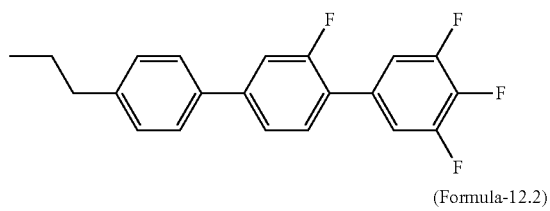

(Formula-12.2)

(Formula-12.3)

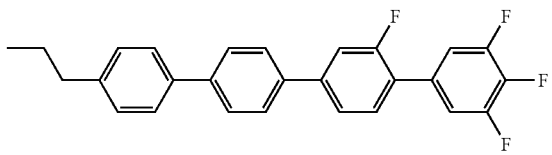

(Formula-12.5)

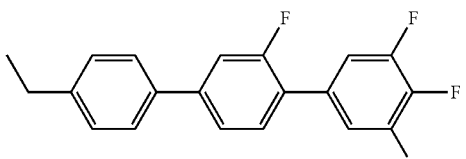

13. The liquid crystal composition according to claim 1, wherein the dielectrically positive component (A) further contains at least one compound selected from the group consisting of compounds represented by (Formula-13.1) or (Formula-13.2).

(Formula-13.1)

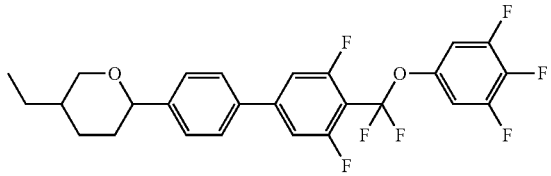

(Formula-13.2)

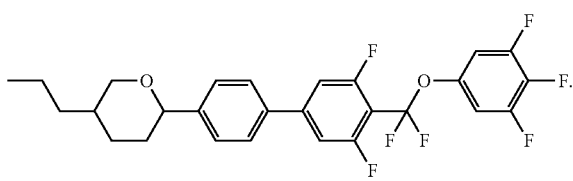

(Formula-17.1)

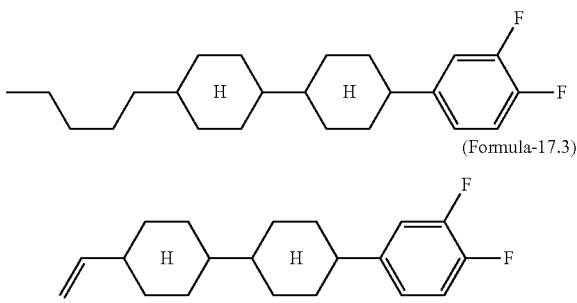

(Formula-17.3)

14. The liquid crystal composition according to claim 1, wherein the dielectrically neutral component (B) further contains at least one compound represented by (Formula-14.1) to (Formula-14.3), (in the formulae, a ring

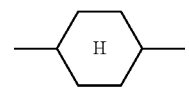

represents a 1,4-transcyclohexylene group).

17. The liquid crystal composition according to claim 1, wherein the dielectrically positive component (A) further contains at least one compound selected from the group consisting of compounds represented by (Formula-18.2) to (Formula-18.4), (Formula-14.1)

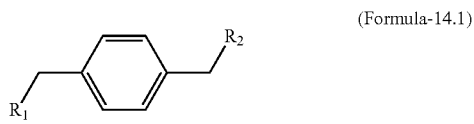

(Formula-14.2)

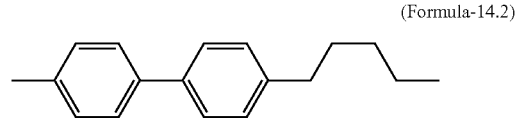

(Formula-18.2)

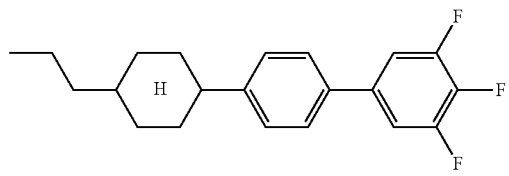

(Formula-14.3)

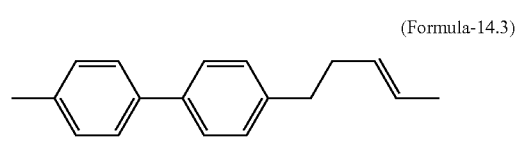

(Formula-18.3)

(in the formulae, R1 and R2 each independently represent a linear alkyl group or linear alkenyl group having 1 to 10 carbon atoms).

15. The liquid crystal composition according to claim 1, wherein the dielectrically neutral component (B) further contains at least one compound represented by (Formula-15.2),

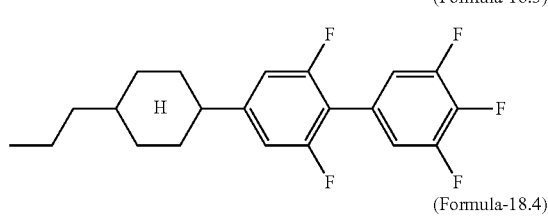

(Formula-18.4)

(Formula-15.2)

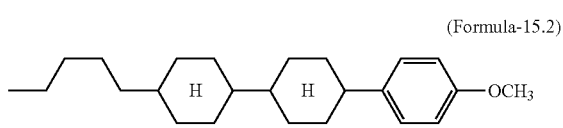

(in the formula, a ring

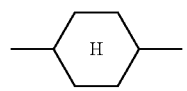

represents a 1,4-transcyclohexylene group).

16. The liquid crystal composition according to claim 1 wherein the dielectrically positive component (A) further contains at least one compound represented by (Formula-17.1) or (Formula-17.3), (in the formulae, a ring

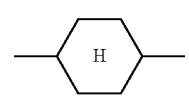

represents a 1,4-transcyclohexylene group).

18. The liquid crystal composition according to claim 1, wherein the dielectrically positive component (A) further contains at least one compound selected from the group consisting of compounds represented by (Formula-19.1), (Formula-19.3), and (Formula-19.4),

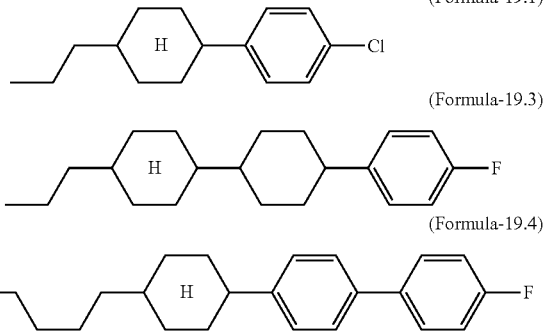

(Formula-19.1)

(Formula-19.3)

(Formula-19.4)

(in the formulae, a ring

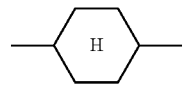

represents a 1,4-transcyclohexylene group).

19. A liquid crystal display device for active matrix driving comprising the liquid crystal composition according to claim 1.

20. A liquid crystal display device for an IPS mode, a FFS mode, or a VA-IPS mode, comprising the liquid crystal composition according to claim 1.

21. The liquid crystal composition according to claim 1, wherein the component (A) containing the dielectrically positive compound represented by (Formula-1) and at least one dielectrically positive compound selected from the group consisting of compounds represented by (Formula-5.1) and (Formula-13.3).

* * * * *